US008544105B2

(12) United States Patent
Mclean et al.

(10) Patent No.: US 8,544,105 B2
(45) Date of Patent: Sep. 24, 2013

(54) METHOD AND APPARATUS FOR MANAGING POLICIES FOR TIME-BASED LICENSES ON MOBILE DEVICES

(75) Inventors: Ivan H. Mclean, Solana Beach, CA (US); Kenneth M. Geib, San Diego, CA (US); Laurence Lundblade, San Diego, CA (US); Tianyu L. D'Amore, San Diego, CA (US); Brian H. Kelley, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1437 days.

(21) Appl. No.: 11/963,991

(22) Filed: Dec. 24, 2007

(65) Prior Publication Data
US 2009/0165083 A1 Jun. 25, 2009

(51) Int. Cl.
*H04L 29/06* (2006.01)
(52) U.S. Cl.
USPC ............... 726/27; 726/1; 709/207; 455/411; 713/176
(58) Field of Classification Search
USPC ............ 726/1; 709/207; 455/411; 713/176
See application file for complete search history.

(56) References Cited

U.S. PATENT DOCUMENTS

| 6,975,852 | B1 * | 12/2005 | Sofer et al. ..................... 455/408 |
| 7,146,559 | B2 | 12/2006 | Sakuma |
| 7,411,868 | B2 | 8/2008 | Kohmoto |
| 7,631,048 | B2 * | 12/2009 | De Treville ................... 709/207 |
| 2004/0235455 | A1 * | 11/2004 | Jiang .............................. 455/411 |
| 2005/0065891 | A1 | 3/2005 | Lee et al. |
| 2006/0150254 | A1 | 7/2006 | Siukonen |
| 2006/0248596 | A1 | 11/2006 | Jain et al. |
| 2007/0121432 | A1 | 5/2007 | Kim |
| 2007/0197197 | A1 | 8/2007 | Minear |
| 2007/0283411 | A1 | 12/2007 | Paramasivam et al. |
| 2009/0240947 | A1 * | 9/2009 | Goyal et al. .................. 713/176 |

FOREIGN PATENT DOCUMENTS

| RU | 2283508 C2 | 9/2006 |
| WO | WO2006070261 | 7/2006 |
| WO | 2007008912 A2 | 1/2007 |

OTHER PUBLICATIONS

European Search Report—EP08102996—Search Authority—Munich—Mar. 23, 2009.
International Search Report and Written Opinion—PCT/US2008/088290—ISA/EPO—Mar. 31, 2009.

* cited by examiner

*Primary Examiner* — Jeffrey Pwu
*Assistant Examiner* — Michael D Anderson
(74) *Attorney, Agent, or Firm* — James T. Hagler

(57) ABSTRACT

Methods and devices provide for creating, managing, modifying, and/or enforcing flexible digital rights management license policies for protecting games, media, data, or other software with a time-based license. Embodiments are especially directed toward situations in which a source of time is unavailable, untrustworthy, or unreliable. Licenses are defined by a small number of parameters. Parameter values may be defined by and included with protected content or applications. The parameter values may be chosen to define and enforce a desired level of compromise between usability and security characteristics.

58 Claims, 16 Drawing Sheets

Figure 2

| parameter name | parameter values | description |
|---|---|---|
| ExpirationDate | a calendar date and/or time of day | Expiration date/time |
| TimeCallAtAccess | TRUE or FALSE | Fetch time at start of content access |
| InCoverageUseLimit | non-negative integer M | In-coverage grace period access usage limit (number of accesses while device is in-coverage) |
| OutCoverageUseLimit | non-negative integer N | Out-of-coverage grace period access usage limit (number of accesses while device is out-of-coverage) |
| UseInCoverageForRoaming | TRUE or FALSE | Roaming policy = in-coverage |
| TimeCallAtStartup | TRUE or FALSE | prompt user for data call upon device start-up |

Figure 3

| policy case | TimeCallAtAccess | InCoverageUseLimit | OutCoverageUseLimit | UseInCoverageForRoaming | TimeCallAtStartup | remarks: All cases here assume that the clock is considered not secure, power is not reliably maintained, and the content or application has a time-based license. | protection from abuse, or level of restriction | expected user experience: "user friendliness" |
|---|---|---|---|---|---|---|---|---|
| 1 | T | 0 | 0 | - | T | Attempts data call on device startup and when accessing protected content. | strongest | very poor |
| 2 | T | 0 | N | T | F | No data call is attempted on device startup. N is small | strong | poor |
| 3 | T | 0 | N | T | T | Attempts data call on device startup. N is large. | okay | very poor |
| 4 | T | 0 | N | T | F | No data call is attempted on device startup. N is large. | okay | poor |
| 5 | T | M | N | T | T | Attempts data call on device startup. M is small. N is large. | okay | very poor |
| 6 | T | M | N | T | F | No data call is attempted on device startup. M is small. N is large. | okay | okay |
| 7 | T | M | N | - | F | No data call is attempted on device startup. M and N are large. | okay | okay |
| 8 | F | 0 | N | T | T | No data call is attempted when accessing content. N is small. | strong | very poor |
| 9 | F | 0 | N | T | F | No data call is attempted when accessing content. N is small. | very good | poor |
| 10 | F | M | N | - | T | A data call is attempted only on device start-up. M and N are reasonably small. | good | poor |
| 11 | F | M | N | - | F | No data call is ever attempted. M and N are small. | okay | good to very poor |
| 12 | F | M | N | - | T | M and N are large. Roaming emulates in-coverage. | weak | poor |
| 13 | F | M | N | - | F | M and N are large. Roaming emulates in-coverage. | very weak | good to very poor |
| 14 | F | M | N | - | F | M and N are large: very open policy | weakest | very good |

Figure 4a

```
401   procedure TestContentLicensing( LicenseParameters )
402   {
403         if LicenseParameters == 0:
404               goto AllowAccess.
410         assertion: ReferencedContent has LicenseParameters.
411         if LocalTimeIsSecure():
412               Set STime = SecureDateTime().
413               goto TestForExpiration.
420         assertion: Local time is not secure.
421         if LicenseParameters.TimeCallAtAccess:
422               Place call to retrieve secure time into STime.
423               if STime was retrieved:
424                     goto TestForExpiration.
430         assertion: Secure time cannot be accessed.
431         if Device.Mode == ModeInCoverage:
432               goto CoverageIn.
433         if Device Mode == Roaming
434               goto Roaming
435         else if Device.Mode == ModeOutCoverage:
436               goto CoverageOut.
440   CoverageIn:
441         if LicenseParameters.InUsesAttempts > M:
442               goto BlockAccess.
443         Increment LicenseParameters.InUsesAttempts.
444               goto AllowAccess.
450   Roaming
451         if LicenseParametersRoamUsesAttempts > R
452               goto BlockAccess
453         Increment LicenseParameters.RoamUseAttempts.
454               Goto AllowAccess
460   CoverageOut:
461         if LicenseParameters.OutUsesAttempt > N
462               goto BlockAccess.
463         Increment LicenseParameters.OutUsesAttempts.
464               goto AllowAccess.
```

Figure 4a continued

```
470    TestForExpiration:
471        assertion: STime is secure
472        if STime > LicenseParameters.ExpirationDate:
473            Mark license as expired.
474            Set LicenseParameters.InUseAttempts > M.
475            Set LicenseParameters.RoamUseAttempts > R.
476            Set LicenseParameters.OutUseAttempts > N.
477            Set LicenseParameters.InCoverageUseLimit = 0.
478            Set License Parameters.RoamUseLimit = 0.
479            Set LicenseParameters.OutCoverageUseLimit = 0.
480            Inform the user that the license is expired.
481            goto BlockAccess.
482        else:
483            Set LicenseParameters.InUseAttempts = 0
484            Set LicenseParameters.RoamUseAttempts = 0
485            Set LicenseParameters.OutUseAttempts = 0
486            goto AllowAccess.
490    AllowAccess:
491        return True.
495    BlockAccess:
496        return False.
499  }
```

Figure 4b

```
401     procedure TestContentLicensing( LicenseParameters )
402     {
403             if LicenseParameters == 0:
404                     goto AllowAccess.
410             assertion: ReferencedContent has LicenseParameters.
411             if LocalTimeIsSecure():
412                     Set STime = SecureDateTime().
413                     goto TestForExpiration.
420             assertion: Local time is not secure.
421             if LicenseParameters.TimeCallAtAccess:
422                     Place call to retrieve secure time into STime.
423                     if STime was retrieved:
424                             goto TestForExpiration.
430             assertion: Secure time cannot be accessed.
431             if Device.Mode == ModeInCoverage:
432                     goto CoverageIn.
433             else if Device.Mode == ModeOutCoverage:
434                     goto CoverageOut.
435             assertion: Device.Mode == ModeRoaming
436             if LicenseParameters.UseInCoverageForRoaming:
437                     goto CoverageIn.
438             else:
439                     goto CoverageOut 440     CoverageIn:
441             if LicenseParameters.InUsesAttempts > M:
442                     goto BlockAccess.
443             Increment LicenseParameters.InUsesAttempts.
444                     goto AllowAccess.
460     CoverageOut:
461             if LicenseParameters.OutUsesAttempt > N
462                     goto BlockAccess.
463             Increment LicenseParameters.OutUsesAttempts.
464                     goto AllowAccess.
```

Figure 4b continued

```
470    TestForExpiration:
471         assertion: STime is secure
472         if STime > LicenseParameters.ExpirationDate:
473              Mark license as expired.
474              Set LicenseParameters.InUsesAttempts > M.
476              Set LicenseParameters.OutUsesAttempt > N.
477              Set LicenseParameters.InCoverageUseLimit = 0.
479              Set LicenseParameters.OutCoverageUseLimit = 0.
480              Inform the user that the license is expired.
481              goto BlockAccess.
482         else:
483              Set LicenseParameters.InUsesAttempt = 0
484              Set LicenseParameters.OutUsesAttempt = 0
485              goto AllowAccess.
490    AllowAccess:
491         return True.
495    BlockAccess:
496         return False.
499    }
```

Figure 5a

```
401    procedure TestContentLicensing( LicenseParameters )
402    {
403            if LicenseParameters == 0:
404                    goto AllowAccess.
410            assertion: ReferencedContent has LicenseParameters.
411            if LocalTimeIsSecure():
412                    Set STime = SecureDateTime().
413                    goto CheckUpdates.
420            assertion: Local time is not secure.
421            if LicenseParameters.TimeCallAtAccess:
422                    Place call to retrieve secure time into STime.
423                    if STime was retrieved:
424                            goto CheckUpdates.
430            assertion: Secure time cannot be accessed.
431            if Device.Mode == ModeInCoverage:
432                    goto CoverageIn.
433            if Device Mode == Roaming
434                    goto Roaming
435            else if Device.Mode == ModeOutCoverage:
436                    goto CoverageOut.
440    CoverageIn:
441            if LicenseParameters.InUsesAttempts > M:
442                    goto BlockAccess.
443            Increment LicenseParameters.InUsesAttempts.
444                    goto AllowAccess.
450    Roaming
451            if LicenseParametersRoamUsesAttempts > R
452                    goto BlockAccess
453            Increment LicenseParameters.RoamUseAttempts.
454                    Goto AllowAccess
460    CoverageOut:
461            if LicenseParameters.OutUsesAttempt > N
462                    goto BlockAccess.
463            Increment LicenseParameters.OutUsesAttempts.
464                    goto AllowAccess.
```

Figure 5a continued

```
470    TestForExpiration:
471        assertion: STime is secure
472        if STime > LicenseParameters.ExpirationDate:
473            Mark license as expired.
474            Set LicenseParameters.InUsesAttempts > M.
475            Set LicenseParameters.RoamUse Attempt > R
476            Set LicenseParameters.OutUsesAttempt > N.
477            Set LicenseParameters.InCoverageUseLimit = 0.
478            Set License Parameters.RoamUseLimit = 0
479            Set LicenseParameters.OutCoverageUseLimit = 0.
480            Inform the user that the license is expired.
481            goto BlockAccess.
482        else:
483            Set LicenseParameters.InUsesAttempt = 0
484            Set LicenseParameters.OutUsesAttempt = 0
485            goto AllowAccess.
490    AllowAccess:
491        return True.
495    BlockAccess:
496        return False.
500    CheckUpdates
501        if STime >= T:
502            Check for update from service provider.
503            if update is available:
504                Open a secure data channel.
505                Send AccessStatistics to provider.
506                Receive NewLicenseParameters from provider.
507                LicenseParameters = NewLicenseParameters.
508                Close secure data channel.
509            else goto Test for Expiration
510        else goto Test for Expiration
511    }
```

Figure 6a

```
601     procedure IsStartupTimeFetchNeeded()
602     {
603             if LocalTimeIsSecure():
604                     return False.
610             assertion: Local time is not secure.
611             for all license parameters L:
612                     if L→TimeCallAtStartup:
613                             return True.
620             assertion: Secure time cannot be accessed.
621             return False.
622     }
```

Figure 7a

```
701     procedure DoLicenseUpdateFromSMS( SMSMessage )
702     {
703             if Validate( SMSMessage ):
704                     Parse SMSMessage.
705                     Determine the protected content license L which SMSMessage identifies.
706                     Set L→LicenseParameters to new values.
707                     return.
710             assertion: SMSMessage is fake.
711             return.
712     }
```

METHOD AND APPARATUS FOR MANAGING POLICIES FOR TIME-BASED LICENSES ON MOBILE DEVICES

FIELD OF THE INVENTION

The present invention relates to methods and systems for creating, managing, modifying, and/or enforcing time-based digital rights management for software applications, data, or other digital content.

BACKGROUND OF THE INVENTION

Digital rights management (DRM) is an umbrella term referring to technologies used by software developers, publishers or copyright holders to control access to or usage of digital content, as well as to restrictions associated with specific instances of digital works or devices. A time-based DRM policy allows a client unlimited access to protected digital content for a limited period of time. To be effective, a processor implementing the time-based DRM policy must have access to a trustworthy source of secure time. In order to maintain the integrity of the time-based DRM policy, access to the protected content should not be permitted if a trustworthy source of secure-time is unavailable. However, such restrictive policies may frustrate clients who believe that they have properly purchased access to the protected digital content and therefore should be permitted access so long as the licensed "limited period of time" has not elapsed, regardless of whether a trustworthy source of secure time is available.

To alleviate such client concerns, some providers of digital content protected under a time-based DRM policy may elect to allow clients continued access to the protected digital content even when a trustworthy source of secure time is unavailable. Most such providers do so under the assumption that a trustworthy source of secure time will become available before the license period expires. Such alternative time-based DRM policies are susceptible to significant fraud. This is because dishonest users may attempt to improperly extend the "limited period of time" license by manipulating or modifying the unsecure time source such that the licensed for "limited period of time" will run in perpetuity. In addition, some dishonest users purposely may make a trustworthy source of secure time unavailable or inaccessible so that continued access to the protected digital content is permitted despite the fact that the license should have expired.

Mobile devices, in particular, suffer from this susceptibility because the internal clock of the mobile device may not be accurate, secure from modification, or even present. Cellular phones, personal data assistants (PDAs), wireless modems, and similar hand-held communication devices are examples of mobile devices which may not have a self-contained, accurate and secure clock. Further, such mobile devices may not have a reliable and/or secure means of retrieving secure time under all conditions.

For these reasons, alternative DRM policies have been devised to limit the usage or access to protected digital content, based on criterion other than time. Examples of such alternative DRM policies include tracking and limiting the number of executions, instances of consumption, or accesses to the protected content. While such alternative DRM policies allow protected content providers an effective alternative to time-based DRM policies, potential clients may be dissuaded from purchasing the protected digital content concluding that such DRM policies are too limiting. As a result, fewer sales of digital content are made. Therefore, protected digital content providers may desire a more reliable method or system for time-based DRM license policies which allow for client access in the event a trustworthy source of secure time is unavailable but prevents excessive fraud by dishonest clients.

SUMMARY OF THE INVENTION

Embodiments of methods and systems presented herein provide a solution to the problem of creating, managing, modifying, and/or enforcing flexible license policies for protecting digital content (e.g., media, data, games, or other software) with a time-based license. Embodiments address situations when a trustworthy source of secure time is unavailable and the time clock, if any, on the mobile device containing the content is untrustworthy or unreliable.

Embodiments are described which allow a wide variety of policies to be fully characterized by a small number of parameters. The values of the parameters—and therefore the selected policy—may be initially set and later dynamically changed at any time, such as by remote downloading of new parameter values. The parameter values may be chosen to define and enforce a desired level of compromise between usability and security characteristics.

BRIEF DESCRIPTION OF THE DRAWINGS

The accompanying drawings, which are incorporated herein and constitute part of this specification, illustrate presently preferred embodiments, and, together with the general description given above and the detailed description given below, serve to explain features of the embodiments.

FIG. 2 is a table of potential license policy parameters, their possible values, and meanings.

FIG. 3 is a table illustrating example policies defined by various combinations of potential parameter values.

FIG. 4a is a listing of an alternative example possible pseudo-code for a procedure implementing the process illustrated in FIG. 4.

FIG. 4b is a listing of an example possible pseudo-code for an alternative procedure to enforce a parameterized time-based license policy.

FIG. 5a is a listing of an example possible alternative pseudo-code for a procedure to enforce a parameterized time-based license policy.

FIG. 6a is a listing of an example possible alternative pseudo-code for a procedure to check whether secure time needs to be obtained from a secure time source.

FIG. 7a provides an example of possible alternative pseudo-code listing for a procedure to check for and download updated license parameters.

DETAILED DESCRIPTION

Figure 1A:
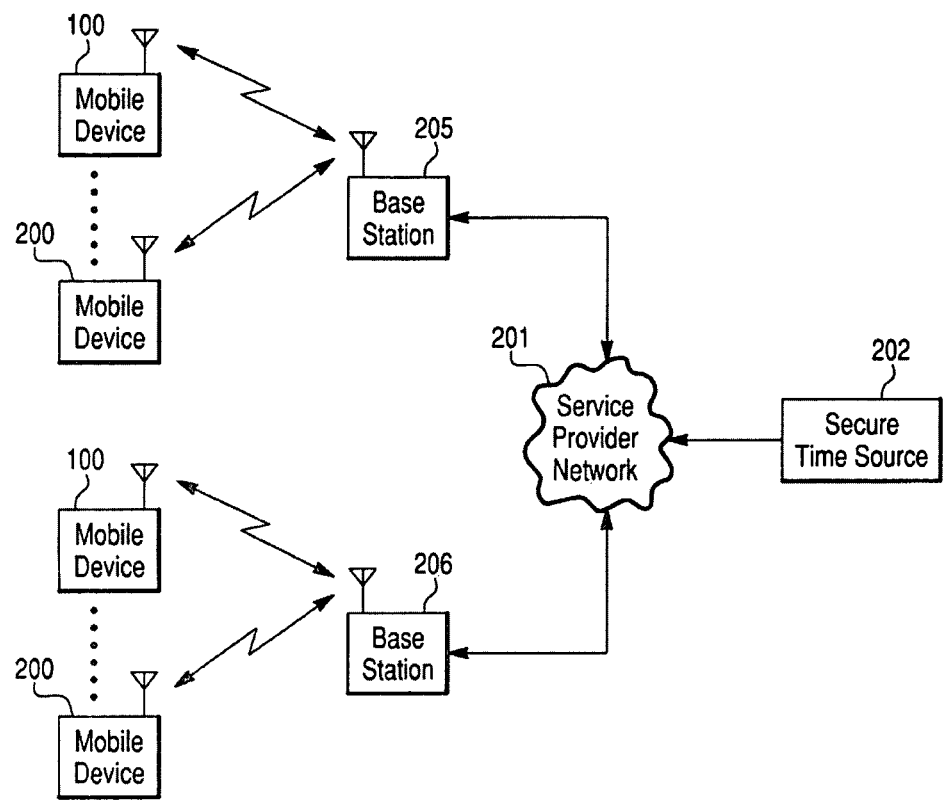
FIG. 1A is a system diagram of a system including a number of mobile devices with access to a secure time source.

Various embodiments of the present invention will be described in detail with reference to the accompanying figures. Wherever possible, the same reference numbers will be used throughout the drawings to refer to the same or like parts.

Licensed protected content, or simply "protected content," may include, but is not limited to, various kinds of media, entertainment rentals, documents, software, data, trial or demo content, and so forth. There are a variety of approaches to copy protection and DRM for protected content.

One of the most common DRM policies is the time-based license. Under such time-based licenses, clients are permitted unlimited access to protected content for a limited period of time—such as up to an expiration date. Herein, the phrase "accessing protected content" and similar phrases encompass viewing, reading, playing, executing, editing, or modifying the content. When the limited period of time has elapsed, the client is no longer permitted access the content protected under the existing license.

An alternative DRM policy may comprise an "infinite" license. In instances when protected content providers do not wish to constantly monitor a license expiration date/time, protected content providers may charge a premium for the protected content and allow the client to access the protected content indefinitely. Essentially, the client purchases the protected content to own, rather than license for a limited period of time. Such protection policies may not be optimum, however, as many potential clients will not wish to pay the premium price when the intended use is limited. Consequently, fewer potential clients may actually become paying clients that access the protected content than if the protected content were available under a time-based license.

Consider the example of a content provider that provides clients with access to music selections. Various DRM policies are available to the content provider. The content provider could make the music selections available to clients under a policy based on usage rules. Such usage rules may comprise an access-count limit which allows a client to play or access a music selection N times. Alternatively, the content provider could make the music selections available to a client under a time-based usage limitation which allows the client to play a music selection until a specific date or time. Due to the nature of the protected content (i.e., music selections) and the manner in which most clients prefer access to such protected content, clients may not want to be limited by the number of times they play a music selection, but would rather be limited by how many days or hours the selection may be played. Consequently, in such situations it can be seen why a time-based licenses is preferred. Similar situations may occur for protected content such as games or videos where a user may want unlimited access to the protected content but expects to grow tired of the protected content over time.

Conventional time-based license policies for protected content compare the license expiration date/time to a time or date value provided by an internal clock. So long as the comparison of expiration date/time to the clock indicates that the date/time of license expiration has not yet elapsed, the processor grants unlimited access to the protected content. If the comparison indicates that the license expiration date/time has elapsed then the processor denies further access to the protected content. While simple in form, such DRM policies and protections may be easily circumvented as it is relatively easy for a dishonest client to manipulate the device clock so that the limited period of time is effectively infinite. PC (or other device) clients may have the ability to "roll-back" the internal clock of the PC (or other device) repeatedly such that the limited period of time never elapses. While software exists to detect such "roll-back" operations, to date such software has not proven to be effective.

A more robust time-based license policy may require that the clock used to compare against the time-based license expiration date/time is a trustworthy and secure time source which provides some form of accurate, reliable, tamper-proof time. Such a source of secure time may be located within the mobile device itself. Otherwise, remotely accessible sources of secure time may be utilized. For example, the website www.time.gov on the Internet is a remotely accessible, accurate, reliable time source which a client cannot modify. So long as a mobile device is forced to refer to a trustworthy and secure time source-local or on a network-a more robust time-based license can operate effectively. time-based Being mobile, cell phones, PDAs, wireless modems, and other mobile communication devices are not typically required to refer to a secure time source. While CDMA devices have a source of time used to closely correlate time keeping, the time may not be secure such that it can be modified or tampered with by the client. GSM devices may have no notion of time, because the time in a GSM device is independently provided or controlled. Consequently, time-based DRM policies can be difficult to effectively enforce on such devices.

An embodiment may comprise a restrictive DRM policy which may insist that secure time be available for comparison against the license expiration date/time before access to the protected content is granted. Such insistence may frustrate the client/user. First, if a source of secure time is not locally available a data call may be required to obtain the external source of secure time. This data call may delay access to the protected content cause frustration to the client/user if the data call is not successful. Second, there may be many situations where the client desires to access the protected content that was properly licensed for, but for reasons beyond the client/user's control, a source of secure time is unavailable. An example of such situation is where a mobile device, without an internal secure clock, is geographically located outside its service provider network. Such a situation may occur when the client/user is traveling and may move out of its service provider network. This situation is referred to as "out of network." Because the mobile device is out of network, the mobile device will not be able to obtain a signal enabling the mobile device to generate a data link with a source of secure time, at least without roaming.

Another example of such a situation may be when the mobile device, without an internal secure clock, is geographically located within its service provider network, but the client has disabled the transceiver functionality of the mobile device. Such a situation may occur when the client/user has entered a location that requires the disabling of the mobile device's transceiver functionality. For example, when the client/user is on an airplane or in a hospital. This situation is referred to as "in network." Because the transceiver functionality of the mobile device has been disabled, the mobile device will not be able to obtain a signal enabling the mobile device to generate a data link with a source of secure time.

Another example of such a situation may be when the mobile device is in "roaming mode." Such a situation may occur when the client/user is traveling outside its particular service provider network, but still may be within another service provider network. When the mobile device is in roaming mode, the mobile device is able to make and receive telephone calls, but is unable to establish a data link with a source of secure time.

A client/user may feel frustrated that access to protected content is not granted in these situations despite the fact that the protected content was properly licensed and the expiration date/time has not elapsed. Such frustration may dissuade the client/user from executing a future time-based license due to the negative experience.

An alternative embodiment may allow the client/user access to the protected content despite the unavailability of secure time, under the assumption that the situations described above are temporary in nature and unlikely to exist for extended periods of time, or for a period of time that extends beyond the license expiration date/time. However, such an alternative embodiment may be exploited by a dishonest client who intentionally creates any of the above situations for a protracted period of time so that the licensed period of time is effectively infinite.

Accordingly, a flexible choice of license policies, especially for use in multi-mode (e.g. a device that can operate in either CDMA and/or GSM environment) devices and in multi-mode markets is desired which provides restrictive access to protected content while preserving the client/user experience. Content providers also desire the ability to dynamically modify the protection policy after sales, including extending or modifying time-based licenses. Additionally, it is desirable for wireless device manufacturers and service providers to be able to configure default or tailored policies on the factory floor or at time of sale. Accordingly, alternative methods and systems for creating, managing, modifying, and/or enforcing time-based DRM policies are needed.

Alternative embodiments address situations when a trustworthy source of secure time is unavailable and the time clock, if any, on the mobile device containing the content is untrustworthy or unreliable. The various embodiments provide improved time-based licenses and DRM policies which are based on the configuration values of a relatively small number of parameters. Such embodiments are particularly aimed at time-based policies where a secure time source that provides accurate and trustworthy time is not always available. Embodiments can include an adaptive enforcement agent that enforces a time-based policy based upon whether secure time is available or unavailable.

A few well-chosen parameters can be used to generate and control a wide range of flexible DRM policies. The wide range of flexible DRM policies may provide varying levels of security and varying degrees of client/user experience which may be inversely related. For example, policies having a very strong level of security may have a very poor rating for client/user experience. Conversely, policies having "okay" levels of security may have "very good" ratings for client/user experience. The various permutations of license parameters may generate a spectrum of policies. Using just a few parameters means that the licenses for a multitude of items of protected content can be compactly contained in the memory of a mobile device. This enables a single relatively simple, secure enforcement agent on the mobile device may serve many or all the needs for DRM.

Generally, robust DRM protection can cause delay, usage limitations, or other inconveniences that may impact a client's experience. For example, requiring a wireless data call to the service provider network to obtain secure time will improve the DRM protection scheme but will delay the client's access to the protected content. Also, the wireless air time required to retrieve the secure time may involve added costs that clients will not appreciate, especially if each access to protected content requires such a phone call, the accesses are frequent, and the client must approve each time-retrieval call. To improve the client's experience, a policy generated by different parameters may require access to secure time only when the mobile device is first powered on, for example.

The following paragraphs describe embodiments with particular parameters, examples of policies based on combinations of parameter values, and procedures for enforcing the policy characterized by a particular combination of parameters values. The particular parameters discussed are provided for illustrative purposes only, and are not intended to limit the scope of the invention or the claims.

FIG. 1A illustrates an embodiment of a system in which time-based licenses may operate. A service provider network 201 supports wireless voice and/or data communication. The service provider network 201 may employ CDMA (Code Division Multiple Access), GSM (Global System for Mobile Communications), Universal Mobile Telecommunications System (UMTS), or other wireless technology. Bidirectional radio communication between mobile devices 100, 200 and the service provider network 201 occur through the base stations 205. The service provider network 201 may have access to a secure time source 202, which is reliable, accurate, and accessible to the mobile devices 100, 200 through the service provider network 201.

Figure 1B:
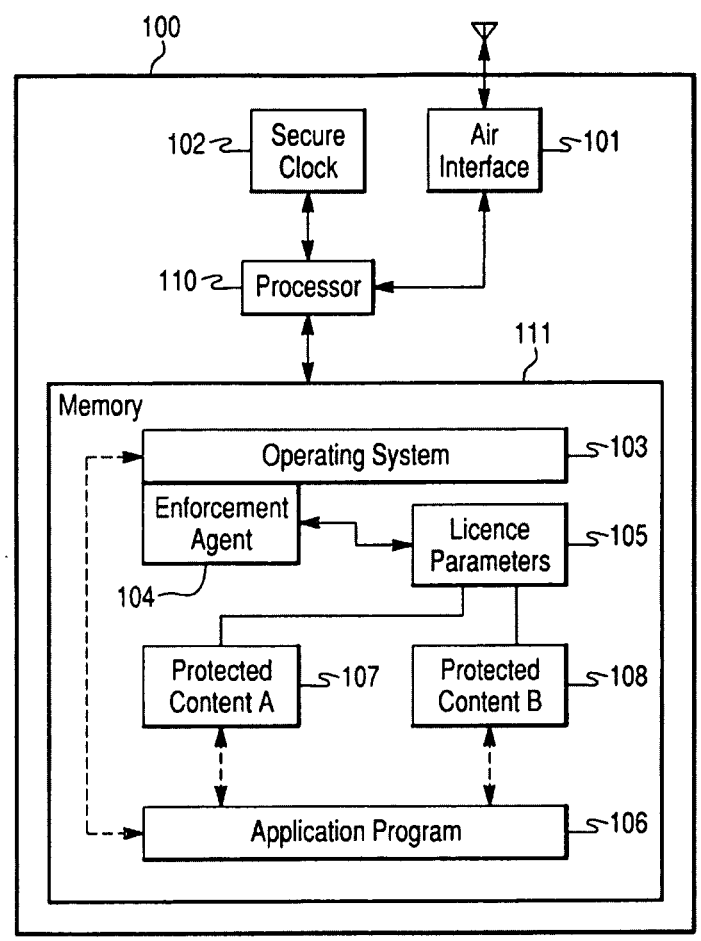
FIG. 1B is a circuit block diagram of elements of a type of mobile device.

An example mobile device 100 is illustrated in more detail in FIG. 1B. The mobile device 100 may include an air interface 101, a secure clock 102, an instruction processor 110, and a memory 111, elements which may be implemented in hardware, software, or combinations thereof. The air interface 101 may be a CDMA (Code Division Multiple Access) interface, a GSM (Global System for Mobile Communications) interface, a multimode interface supporting CDMA and GSM, or a subsequent derivative of one of these wireless interfaces. The secure clock 102 may provide a local source of secure time. The mobile device 100 may securely update the local secure clock 102 on occasion using the system secure time source 202 accessible through the service provider network 201. The instruction processor 110 may be one or more microprocessors, microcontrollers, digital signal processors (DSPs), application-specific integrated circuits (ASICs), or any combination thereof. The memory 111 is accessible by the instruction processor 110 as a source of processor instructions and/or data. The memory 111 may include any combination of random access memory (RAM), read-only memory (ROM), flash memory, programmable read-only memory (PROM), erasable electronically programmable memory (EEPROM), erasable read-only memory (EPROM), disc drive memory, or the like. The instruction processor 110 may include hardware which can control access to the air interface 101, to the secure clock 102, to one or more portions of the memory 111, and/or to other resources of the mobile device 100 such as input/output units.

Stored in the memory 111 may be instructions to be executed by the instruction processor 110 and/or digital data to be accessed by the instructions executed by the instruction processor 110. The instructions and data may include an operating system (OS) 103, a license enforcement agent 104, license parameters 105, one or more application programs 106, and items of protected content 107, 108. The operating system 103 is a set of instructions to control the basic operation of the mobile device 100. The operating system 103 may control client access to certain secure portions of the memory 111 containing license parameter values 105 and/or one or more instances of protected content 107, 108 stored in the memory 111. The operating system 103 itself must be secure (i.e., tamperproof) from the client in order to enforce the security of the protected content 107, 108. There may be a separate set of license parameter values for each item of protected content 107, 108. In an alternative embodiment one set of parameter values may apply to more than one item of protected content 107, 108. The operating system 110 may grant to a license enforcement agent 104 privileged access to certain secure portions of memory 111, such as privileged access to the license parameters 105. Execution of the one or more applications programs 106 may be under the control of the operating system 103, including whether application programs 106 may execute. The operating system 103 may also control whether applications 106 can access hardware resources and memory 111. For example, the operating system 103 may control hardware in the processor 110 which dynamically constrains various blocks of contiguous addresses of the memory 111 as being executable, read-write, read-only, or inaccessible.

Figure 1C:
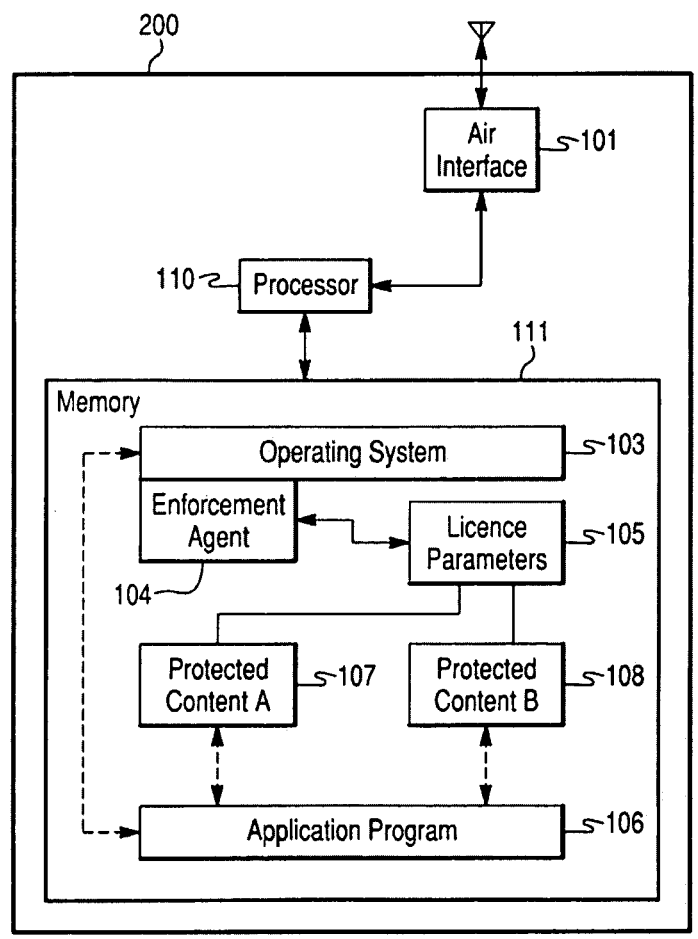
FIG. 1C is a circuit block diagram of elements of another type of mobile device.

Another example mobile device 200 which does not include a secure local clock is illustrated in FIG. 1C. The mobile device 200 illustrated in FIG. 1B includes elements with functions similar to those of the elements of mobile device 100 illustrated in FIG. 1B. Without a local secure clock or an equivalent the mobile device 200 does not have a local source of secure time. The mobile device 200, however, may be able to obtain secure time by placing a data call to the service provider network 201 through the air interface 101 as controlled by software instructions stored in the memory 111 which are executed in the instruction processor 110.

This data call may be achieved in a variety of ways. The mobile device 200 may place a cellular telephone call to a particular number that can establish a data communication link with a secure time source to receive secure time data as a wireless data packet. Alternatively, the mobile device 200 may open a browser and establish a connection to the secure time source via a wireless connection to the Internet, connecting to the secure time source by accessing an IP address for the source. As a third alternative, the data call may be achieved by sending a special SMS message to an address that can return secure time and waiting for an SMS message in response. Each of these alternative ways for calling the secure time source can be managed by air interface 101 as controlled by software instructions stored in the memory 111 which are executed in the instruction processor 110. References herein to a "data call" are intended to encompass each of these alternatives and any other wireless data communication links that the mobile device could establish with the secure time source.

Secure time which the service provider network 201 returns as part of the data call must be secure as well in order to insure that the client cannot tamper with the received time. The operating system 103 may enforce the security of the data call or of the secure time returned as data in the data call. For example, the security of the secure time may be provided by authenticating the data in the data call. Authentication of the time data may be achieved via including a digital signature or a hash function-based message authentication code (HMAC) of the time data using these well known authentication methods. Additionally, the time data may be encrypted using well known encryption methods. Alternatively, the operating system 103 may insure there is no way for a client to intercept or manipulate the secure time returned in the data call. For example, the operating system 103 may prevent client access to the data call-directly or indirectly-through commands or input to any application program 106 or through the normal functionality of the mobile device 200 available to a client.

Any number of mobile devices may be in communication with the service provider network 201 through one or more base stations 205. In order to simplify the description of the various embodiments, reference will be made to mobile devices 100 and mobile devices 200 which represent two classes of mobile devices: one class (mobile devices 100) having a secure clock and one class (mobile devices 200) lacking a secure clock.

The items of protected content 107, 108 are protected by license policies characterized by a stored set of license parameter values 105. The parameter values 105 may be stored in a secure portion of the memory 111, which is not client accessible through menu options or the normal functionality of the mobile device. In that manner the client cannot modify the parameter values 105 to defeat the provisions of the license policy characterized by the parameter values 105. As such, the license parameters 105 are considered secure from client tampering.

Access to protected content 107, 108 may be administered by an enforcement agent 104, which may be embodied in hardware, firmware, software, and/or a combination thereof. The service provider network 201 can modify the parameter values, such as through a secure data call between the mobile device 100, 200 and the service provider network 201 in which data is transmitted to the operating system 103 or to the license enforcement agent 104 running on the mobile device 100, 200. The enforcement agent 104 must also be secure against tampering by a dishonest user. For example, the enforcement agent 104 may be instructions for the processor 110 stored in a secure portion of the memory 111.

The main duty of the enforcement agent 104 is to verify that access to an item of protected content 107, 108 is authorized under the licensing policy which the license parameter values describe. The enforcement agent 104 generally operates in a privileged, secure processor state and has access to at least some secure portion of the memory 111, particularly the memory containing the license parameter values 105 for protected the content 107, 108. Keeping the license parameter values in a secure portion of memory 105 is necessary to prevent a dishonest user from modifying the license parameter values to circumvent protection of one or more items of protected content 107, 108. The enforcement agent 104 may not need access to the protected content 107, 108 itself.

Meanwhile, an application program normally operates under a restricted set of privileges assigned by the operating system 103 and therefore cannot access the license parameter values 105 in a secure portion of the memory 111. The application program may be able to access the protected content 107, 108, but only after the license parameter values 105 associated with the protected content 107, 108 are first used by enforcement agent 104 to confirm that access to the protected content 107, 108 is authorized. If the enforcement agent 104 determines that the license parameter values 105 describe a license which is no longer valid, access to the protected content 107, 108 is blocked. If the enforcement agent 104 allows access to the protected content 107, 108, it may inform the operating system to allow an application program 106 to temporarily access the protected content 107, 108.

An example of an enforcement agent 104 is Qualcomm's BREW system. A BREW-based application, for instance, may be digitally signed (by Qualcomm or the content provider) with the privileges required to access needed resources. Therefore, the application can only access resources accessible under those privileges. As such, BREW may exclude an application from write-access to the policy parameters' memory and exclude all application access to the memory containing protected content—at least initially.

The enforcement agent 104 may require access to a secure clock 102, if one exists. Secure time is preferably maintained on the device, but at least the device will be capable of retrieving or updating time on demand whenever a network connection can be established and secure time from the secure time source 202 is available. A license policy enforced by the enforcement agent 104 may describe various cases, such as how to react if no secure time is available and when the device's network connection is in-coverage, outside-coverage, or roaming.

The table in FIG. 2 lists examples of license parameters, their possible values, and brief descriptions of their meanings. FIG. 2 is not meant to be exhaustive, but merely illustrative to show the potential parameters that may be used to define or describe a licensing scheme. The first parameter identified in FIG. 2 is ExpirationDate, which may be the date and/or time of day when the license expires under an ordinary time-based DRM policy. This value is similar to expiration dates or times in conventional time-based license DRM data files.

The second parameter identified in FIG. 2 is TimeCallAtAccess. This parameter can dictate whether or not the license enforcement agent 104 must first successfully retrieve secure time from a secure time source 202, such as through a data call, before accessing the protected content (e.g., 107, 108). Of course, an internal secure clock 102 constitutes a secure time source, so if a secure clock is available and correctly maintained (even a secure clock needs input from somewhere, even if these updates are infrequent), such a data call will be unnecessary. In the event the mobile device 200 is required to make a data call to retrieve secure time (for example the device does not have an internal secure clock 102 and TimeCallAtAccess="1"), the client may be inconvenienced by the delay in access to protected content caused by the mobile device 200 placing a data call to contact a remote source of secure time 202. While such a delay may be an inconvenience to the client and degrade the user/client experience, such measures may be necessary to ensure robust protection of the protected content from fraudulent use. In accordance with the time-based license, the expiration date/time, ExpirationDate, is compared against the secure time retrieved from the secure time source to determine if access is authorized before the intended action may proceed.

Service providers may wish to allow clients the ability to continue to access the usage protected content on a limited basis even though secure time may be temporarily unavailable to the mobile device 200. In instances where a client's mobile device 200 is within the service provider network coverage area 201 but is unable to access secure time from a secure time source 202 (i.e., in coverage), the client may be permitted a limited number of "grace period" accesses to the protected content. For example, visitors are often requested to turn off cellular telephones while they are within a hospital. As another example, airline passengers are required to disable the transmitter portion of mobile devices 200 while the aircraft is in flight. Also, mobile devices 200 may not be able to receive signals from the service provider network 201 when inside some buildings or subway systems. As a further example, with a "grace period" license, the client in each of these situations may still be allowed to use the licensed games, music, videos, applications, etc. operating on the mobile device 200 even with the wireless functionality turned off. In these examples, although the mobile device 200 may be within the service provider network 201 coverage, the mobile device 200 cannot access secure time from a secure time source 202 because the wireless functionality is disabled or signals are blocked by structure. Alternatively, in cases where the wireless device is outside coverage of the service provider network 201, secure time from a secure time source may be unavailable regardless of whether the wireless functionality is disabled or not. In both instances, clients may be permitted limited access to the protected content.

The InCoverageUseLimit parameter shown in FIG. 2 is a parameter which specifies a limit on the number of "grace period" uses (or time) for the situation where the mobile device 200 is within the service coverage area. This in-coverage grace-period parameter may have a non-negative integer value M to represent the maximum number of times that protected content may be accessed while the mobile device 200 is inside service provider network 201 coverage but the mobile device 200 is unable to successfully retrieve or verify time from a secure time source.

The OutCoverageUseLimit parameter shown in FIG. 2 is a similar parameter which specifies a limit on the number of "grace period" uses (or time) for the situation where the mobile device 200 is outside the service coverage area (i.e., out of coverage). This out-of-coverage grace-period parameter may have a non-negative value N to represent the maximum number of times that protected content may be accessed when the mobile device 200 is outside the service provider network 201 coverage area and the mobile device 200 is unable to successfully retrieve or verify time from a secure time source.

In a time-based license characterized by the InCoverageUseLimit and OutCoverageUseLimit parameters, a grace-period access-counter within the enforcement agent 104 keeps track of the number of times that protected content is accessed while secure time is unavailable. There may be separate counters for counting the number of accesses made without secure time available while in the coverage area and outside the coverage area. Each time that protected content is accessed while secure time is unavailable, the value of M or N as appropriate, may be compared to the associated grace period counter to determine if the access will be authorized. There may also be distinct grace-period in-coverage and out-of-coverage access counters for each individual item of protected content. In other words, a separate grace-period counter may be incremented for each song, game, video, or application program that is accessed when secure time is unavailable. Alternatively, a single counter may be implemented to count the number of times a client accessed any type of protected content.

Upon a client's request to access protected content (e.g., 107, 108,) the enforcement agent 104 compares the count in the appropriate grace period counter with the corresponding limit value, M or N. If the count equals or exceeds the limit value (i.e., M or N), the enforcement agent 104 prohibits access to the protected content. Otherwise, the enforcement agent increments the appropriate grace-period counter and allows the access to the protected content to continue. In this way, when secure time is unavailable, the client is permitted a limited number of accesses to protected content. Once the number of access attempts exceeds a predetermined limit, further access is denied until secure time is available from a secure time source.

By providing separate limits (M and N) and counters for in-coverage and out-of-coverage access situations, licensors can offer for more flexible DRM policies than would be possible if there were only one limit and one counter. For example, a licensor may make assumptions about why secure time may not be accessible and craft time-based license policies to distinguish between the possible reasons for the inaccessibility. For example, if the creator of a license policy presumes that a client may intentionally shield the mobile device 200 so it appears to be outside service provider network 201 coverage after the expiration of the license, the DRM policy may be crafted to limit the number of accesses to the protected content covered by the license. If the creator of a policy is concerned that a mobile device 200 within coverage may not reliably gain access to a remote secure time source 202, the policy may be set to allow a larger number of accesses to the usage protected content.

Alternative embodiments may provide a single grace period limit and an associated access count counter, which are employed anytime secure time is unavailable, regardless of whether the client's mobile device 200 is in-coverage or out of coverage.

In an embodiment, the various grace period counters may be reset whenever secure time becomes available again after a period (a number of accesses to protected content) during which secure time was not available. Once secure time becomes available the enforcement agent 104, 204 can determine whether the terms of corresponding licenses are still valid and have not yet expired. If it has not expired, the enforcement agent 104, 204 may reset the grace period counters accordingly.

If secure time becomes available and if enforcement agent 104, 204 determines that the current time is past the expiration date, i.e., the license has expired, the enforcement agent 104 may explicitly deactivate or even delete the usage protected content (e.g. 107, 108) and/or license parameters (e.g., 105, 205) from memory 110. Alternatively, the enforcement agent 104 may modify the policy parameters (105, 205) of a license discovered to be expired so that the associated content (107, 108) cannot be accessed under any conditions, whether in-coverage or out-of-coverage. For example, preventing all further access may be accomplished by setting M and N to zero. Whenever the client attempts to access the protected content (107, 108) the mobile device 100, 200 may notify the client of the situation and also encourage the client to renew the license. The service provider may even provide a client-friendly way to renew a license and download updated license parameter values.

Another parameter listed in FIG. 2 is UseInCoverageForRoaming, which may have a value of TRUE or FALSE, to separately address the situation when the mobile device is in roaming mode and no secure time is available. Providing a separate roaming license parameter allows licensors to address the common situation where licensees are traveling and thus would face higher air time charges from the placement of a data call to a secure time source. Rather than impose higher costs on licensees, the DRM license can be crafted to treat the situation as an out of coverage or in coverage situation. When this parameter is employed, if the value of the parameter is TRUE, the in-coverage part of the policy is applied when the mobile device is in roaming mode and no secure time is available. Consequently, when the mobile device is in roaming mode, the enforcement agent 104 will enforce the usage policies as if the mobile device is in coverage but secure time is unavailable (e.g., wireless functionality is disabled), using the InCoverageUseLimit parameter M to limit usage. Alternatively, if the value of the parameter is set to FALSE, the out-of-coverage policy is applied when the mobile device is in roaming mode and no secure time is available, thus invoking use of the OutCoverageUseLimit parameter N. Alternatively, a third grace period limit (e.g., RoamCoverageUseLimit) and an associated access count counter (e.g., RoamUsesRemaining) may be implemented to provide specific license terms for the situation where the mobile device 200 is roaming. In a further embodiment, a RoamCoverageUseLimit could be used in place of the UseInCoverageForRoaming parameter.

The last parameter listed in FIG. 2, TimeCallAtStartup, which may be TRUE or FALSE, can be provided to specify whether the mobile device should attempt to retrieve secure time when the device is turned on. If this parameter is TRUE the enforcement agent 104 must retrieve secure time at start up before access to the protected content can be allowed. A data call at startup of the mobile device 100 may be required because the secure clock 102 on the mobile device 100 may lose track of time while power is off or the secure time may become unreliable while power is off.

The enforcement agent 104 may initiate a data call to retrieve secure time by sending a special data message, such as an SMS text message, via the operating system 103, the processor 110, and the air interface 101 through the network 201. The special data message may be addressed to the secure time source 202 and may have a specific format which the secure time source 202 recognizes as a request for secure time. In response to the message from the enforcement agent 104, the secure time source 202 may send a reply SMS message to the enforcement agent 104 which contains the secure time in the SMS message data payload. The reply message itself must employ some form of security to maintain the security of the secure time. The reply message may be secured by encrypting and authenticating the data contained in the reply message. When the enforcement agent 104 receives the secure time, the secure time may be used to update a secure clock 102.

The TimeCallAtStartup parameter differs from the other license parameters which are applied "on demand" (i.e., at the time access to protected content is requested). If the license parameter TimeCallAtStartup is true for any or the license policies represented by all the license parameters 105 in the memory 111, then the enforcement agent 104 must acquire secure time just after the mobile device 100, 200 is started up or powered on. Use of license parameter TimeCallAtStartup is not mutually exclusive with the other license parameters and may be used in conjunction with the other parameters in order to enhance the robustness of the DRM license. Because TimeCallAtStartup may be true for some protected content license policies but not all, the enforcement agent 104 may need to scan all the license parameters 105 in the memory 111 just after the mobile device 100, 200 starts up. If license parameter TimeCallAtStartup is true for at least one license policy, then the enforcement agent 104 must check for an internal secure time source, and if that is not present, place a data call to attempt to acquire secure time from the secure time source 202. A procedure for scanning the license parameters 105 to test for a true value of TimeCallAtStartup is described later with reference to FIGS. 6 and 6a.

Implementation of the parameter TimeCallAtStartup may degrade the user/client experience by causing the client to experience delay at startup due to the requirement that a mobile device 200 without an internal secure time source make a data call to retrieve secure time. In addition, the client/user may be confused as to why a data call is necessary when no request for access to protected content has been made. Nevertheless, such measures may be deemed necessary by some license providers to ensure the robustness of the protection of the protected content from fraudulent use. While the data call at startup may be considered intrusive and annoying to the user/client, the single data call at startup may be less intrusive or annoying than requiring a data call made each time access to protected content is requested. By requiring both a data call at startup and a data call at each access request, the protection mechanisms would be reinforced but at the expense of the user's experience.

Simply by assigning values to a small number of parameters, such as those listed in FIG. 2, a flexible time-based license can be characterized which can be used to balance security against intrusion on the user's experience. FIG. 3 illustrates how various combinations of values for the potential parameters of FIG. 2 can characterize a range of policies. Selected example policies will now be discussed for illustration purposes.

Policy 1 shown in FIG. 3 is an example of a license policy in which the value of TimeCallAtAccess is TRUE, thus requiring the enforcement agent 104 to retrieve secure time whenever access to the protected content is requested. In addition, policy 1 allows for zero grace period access attempts when the mobile device 200 is in service provider network 201 coverage or out of service provider network 201 coverage. Whether or not roaming emulates the in-coverage case is therefore inconsequential, because zero grace period accesses are allowed in any case. That is, UseInCoverageForRoaming may be either TRUE or FALSE. Policy 1 also includes a TimeCallAtStartup value of TRUE, requiring the enforcement agent 104 to retrieve secure time at start up of the mobile device 100, 200. With these DRM license parameter settings, the client can only access the protected content associated with the license when secure time is available. Consequently, the protection from abuse or level of restriction is deemed among the strongest of policies. However, this protection comes at the expense of the user's experience. If the mobile device 200 does not include a secure time source, the policy requires frequent data calls to retrieve secure time and access to the content will be denied any time the transceiver is disabled or the mobile device is out of the coverage area.

Policy 2 in FIG. 3 is an example of a license policy in which the value of TimeCallAtAccess is TRUE, thus requiring the enforcement agent 104 to retrieve secure time whenever access to the protected content is required. If secure time is unavailable and the mobile device 200 is within the coverage area, policy 2 allows zero grace period access attempts. However, if secure time is unavailable and the mobile device 200 is out of the coverage area, policy 2 allows N grace period access attempts. The policy also includes a UseInCoverageForRoaming parameter of TRUE, so when the mobile device 200 is in roaming mode, the policy follows the in-coverage circumstance, namely allowing no grace period accesses. Policy 2 does not require the enforcement agent 104 to retrieve secure time when the mobile device 100, 200 is started. With these parameter settings in place, protection against abuse is deemed "strong", which is slightly less abuse resistant than policy 1. The downgraded effectiveness rating is because a client is permitted a few accesses to the protected content even though secure time is unavailable. In addition, policy 2 does not require the added data call at startup. Nevertheless, the level of protection is considered strong because N is small, thus the number of grace period access attempts allowed is small. For the same reasons, the user experience is upgraded from "very poor" to "poor."

Policy 3 shown in FIG. 3 is an example of a license policy in which the value of TimeCallAtAccess is TRUE, thus requiring the enforcement agent 104 to retrieve secure time whenever access to the protected content is required. If secure time is unavailable and the mobile device 200 is within the coverage area, policy 3 allows for zero grace period access attempts. If secure time is unavailable and the mobile device 200 is out of the coverage area, policy 3 allows at most N grace period access attempts. However, in contrast to policy 2, N is large thereby providing a large number of out-of-coverage grace period uses. Policy 3 requires the enforcement agent 104 to retrieve secure time at start up of the mobile device 100, 200. In policy 3 the level of protection is deemed "okay," because policy 3 is open to abuse if the client intentionally remains outside coverage to take advantage of the large number of permitted grace period attempts. With these license parameters, the user experience is deemed "very poor" because of the data call upon start-up of the mobile device 200 and the data call when access to the protected content is requested for mobile devices that do not include internal secure time sources.

Policy 4 is nearly identical to policy 3, but does not require the data call for secure time at startup. As such, the level of protection of policy 4 is deemed "okay" (but slightly less so than policy 3). However, the user/client experience is upgraded from "very poor" to "poor" due in large part to the absence of a data call at start up.

Policy 5 is an example of a license policy in which TimeCallAtAccess is TRUE, therefore requiring the enforcement agent 104 to retrieve secure time whenever access to the protected content is required. If secure time is unavailable and the mobile device 200 is within the coverage area, policy 5 allows M grace period access attempts. If secure time is unavailable and the mobile device 100, 200 is out of the coverage area, policy 5 allows N grace period access attempts. In policy 5, M is set to a small value, while N is set to a large value. The UseInCoverageForRoaming parameter is TRUE, so when the mobile device 100, 200 is in roaming mode, the policy emulates the in-coverage case, namely allowing M grace period accesses. If the mobile device 200 is outside coverage, the content may be accessed almost indefinitely, because N is large. The TimeCallAtStartup parameter is TRUE so Policy 5 requires the enforcement agent 104 to retrieve secure time at start up of the mobile device 100, 200. With these parameter settings in place, protection in policy 5 is deemed "okay." While policy 5 benefits from the requirement that a data call for secure time is made at start up and at each instance of request, a client is permitted a number of grace period access attempts when the mobile device 100, 200 is either in network or our of network. Because of these permitted grace period attempts, the level of protection is downgraded to "okay." The user experience for policy 5 is deemed "very poor", because policy 5 still requires multiple data calls if the mobile device 200 lacks an internal source of secure time. Moreover, the number of grace period attempts when the mobile device 100, 200 is in network is small. A small value of M overly constrains the user to only a few accesses to the protected content when in-coverage.

Policy 6 is an example of a license policy similar to policy 5, but does not require the data call for secure time at startup. As such, the level of protection of policy 6 is deemed "okay" (but slightly less so than policy 5). However, the user/client experience is upgraded from "very poor" to "okay" due in large part to the absence of a data call at start up.

Policy 7 is an example of a license policy in which TimeCallAtAccess is TRUE, thus requiring the enforcement agent 104 to retrieve secure time whenever access to the protected content is required. If secure time is unavailable and the mobile device 200 is within the coverage area, policy 7 allows at most M grace period access attempts. If secure time is unavailable and the mobile device 100, 200 is out of the coverage area, policy 7 allows at most N grace period access attempts. In policy 7, M and N are set to large values. Whether or not the mobile device 100, 200 is roaming is not particularly pertinent, because both M and N are large. Policy 7 also sets TimeCallAtStartup to FALSE, thus eliminating the need for a data call at start up. With these parameter settings, the level of protection is deemed "okay", but the policy is open to abuse for long periods if the user forces the data call to fail. Because M and N are large, the user experience is deemed "okay".

Policy 8 is an example of a license policy in which TimeCallAtAccess is FALSE, so the enforcement agent 104 does not need to retrieve secure time whenever access to the protected content is required. If secure time is unavailable and the mobile device 200 is within the coverage area, policy 8 allows zero grace period access attempts. If secure time is unavailable and the mobile device 200 is out of the coverage area, policy 8 allows at most N grace period access attempts, and N is small. UseInCoverageForRoaming is set true, so when the mobile device 100, 200 is in roaming mode, the policy emulates the in-coverage circumstance. Policy 8 requires the enforcement agent 104 to retrieve secure time only at start up of the mobile device 100, 200. With these parameter settings in place, protection in policy 8 is deemed "strong" and is open to abuse only for a limited time, because N is small. Because, policy 8 still requires a data call at startup and only permits a limited number of grace period access attempts when the mobile device 100, 200 is out of network, the user experience is deemed "very poor".

Policy 9 is an example of a license policy similar to policy 8 but no longer requires a data call at start up. As a result the level of protection is downgraded from "strong" to "very good" but the expected user experience is upgraded from "very poor" to "poor." This is due in large part to the absence of data calls.

Policy 10 is an example of a license policy in which TimeCallAtAccess is FALSE, so the enforcement agent 104 does not need to retrieve secure time whenever access to the protected content is required. If secure time is unavailable and the mobile device 200 is within the coverage area, policy 10 allows at most M grace period access attempts. If secure time is unavailable and the mobile device 200 is out of the coverage area, policy 10 allows at most N grace period access attempts. M and N are both small, so the setting for UseInCoverageForRoaming is not particularly relevant. Policy 10 requires the enforcement agent 104 to retrieve secure time only at start up of the mobile device 100, 200. Since M and N are reasonably small, policy 10 allows only limited access to the protected content when secure time is not available-whether in coverage, out of the coverage area, or while roaming. With these parameter settings in place, protection of the protected content is deemed "good", because the policies are open to abuse only for a limited time. Also, the protection under policy 10 is "good", because of the required start-up data call for mobile devices that lack an internal source of secure time. The user experience for policy 10 is deemed "poor", because M and N are small and because the data call on startup of the mobile device 200 is intrusive and confusing to user. Nevertheless, user experience may be "very poor", if the mobile device 200 cannot frequently provide secure time and the client is stuck with limited grace periods whether the mobile device 100,200 is in coverage, out of the coverage area, or in roaming mode. The start-up call may be confusing, because the start-up call is not obviously related to an attempt to access the protected content associated with the license being validated.

Policy 11 is an example of a license policy similar to policy 10, but no longer requires the data call for secure time at start up. Because data calls for secure time are no longer required the effectiveness of policy 11 to protect the content is downgraded from "good" to "okay." However, the expected user experience may improve to "good", but may be "very poor" under certain circumstances. The user experience for policy 11 is deemed "good", because no data call is ever required and so is not intrusive. Nevertheless, user experience may be "very poor", if the mobile device 100, 200 cannot frequently provide secure time and the client is stuck with limited grace periods whether the mobile device 100,200 is in coverage, out of the coverage area, or roaming.

Policy 12 is an example of a license policy which sets the value of TimeCallAtAccess to false, so the enforcement agent 104 does not need to retrieve secure time whenever access to the protected content is required. If secure time is unavailable and the mobile device 100, 200 is within the coverage area, policy 12 allows at most M grace period access attempts. If secure time is unavailable and the mobile device 100, 200 is out of the coverage area, policy 12 allows at most N grace period access attempts. M and N are both large, so the setting for UseInCoverageForRoaming is not particularly relevant. Policy 12 requires the enforcement agent 104 to retrieve secure time only at start up of the mobile device 100, 200. The values of M and N are large, in contrast to policy 10, and therefore weaken the protection of policy 12 when the mobile device 100, 200 is out of coverage. With these parameter settings in place, protection is deemed "weak" because the policy can be abused for longer periods of time by exploiting the larger number of grace period access attempts. The user experience for policy 12 is deemed "poor", because the data call on startup of mobile device 100, 200 is intrusive and confusing to user. The start-up call may be confusing, because the start-up call is not obviously related to an attempt to access the protected content associated with the license being validated.

Policy 13 is an example of a license policy similar to policy 12, but removes the need for a data call at startup. The values of M and N are large, in contrast to policy 11, and weaken the protection of policy 13 when the mobile device 100, 200 is out of coverage. Therefore, the policy can be abused for longer periods than for policy 11 by exploiting the longer grace periods. In addition, the absence of any data call render policy 13 weaker than policy 12. With these parameter settings in place, the protection is deemed "very weak". The user experience for policy 13 is deemed "good", because no data call is ever required and so is not intrusive.

Policy 14 is an example of a license policy which sets the value of TimeCallAtAccess to false, so the enforcement agent 104 does not need to retrieve secure time whenever access to the protected content is required. If secure time is unavailable and the mobile device 100, 200 is within the coverage area, policy 14 allows at most M grace period access attempts. If secure time is unavailable and the mobile device 100, 200 is out of the coverage area, policy 14 allows at most N grace period access attempts. M and N are both large, so the setting for UseInCoverageForRoaming is not particularly relevant. With these parameter settings in place, policy 14 of FIG. 3 provides the least secure DRM protection from abuse by a client and least protection for the content provider. Policy 14 allows access to usage protected content for long periods with little effort by user to the point of abuse, so policy 14 is deemed "very weak". However, policy 14 is completely unobtrusive to the user and so is deemed "very good".

Figure 4:
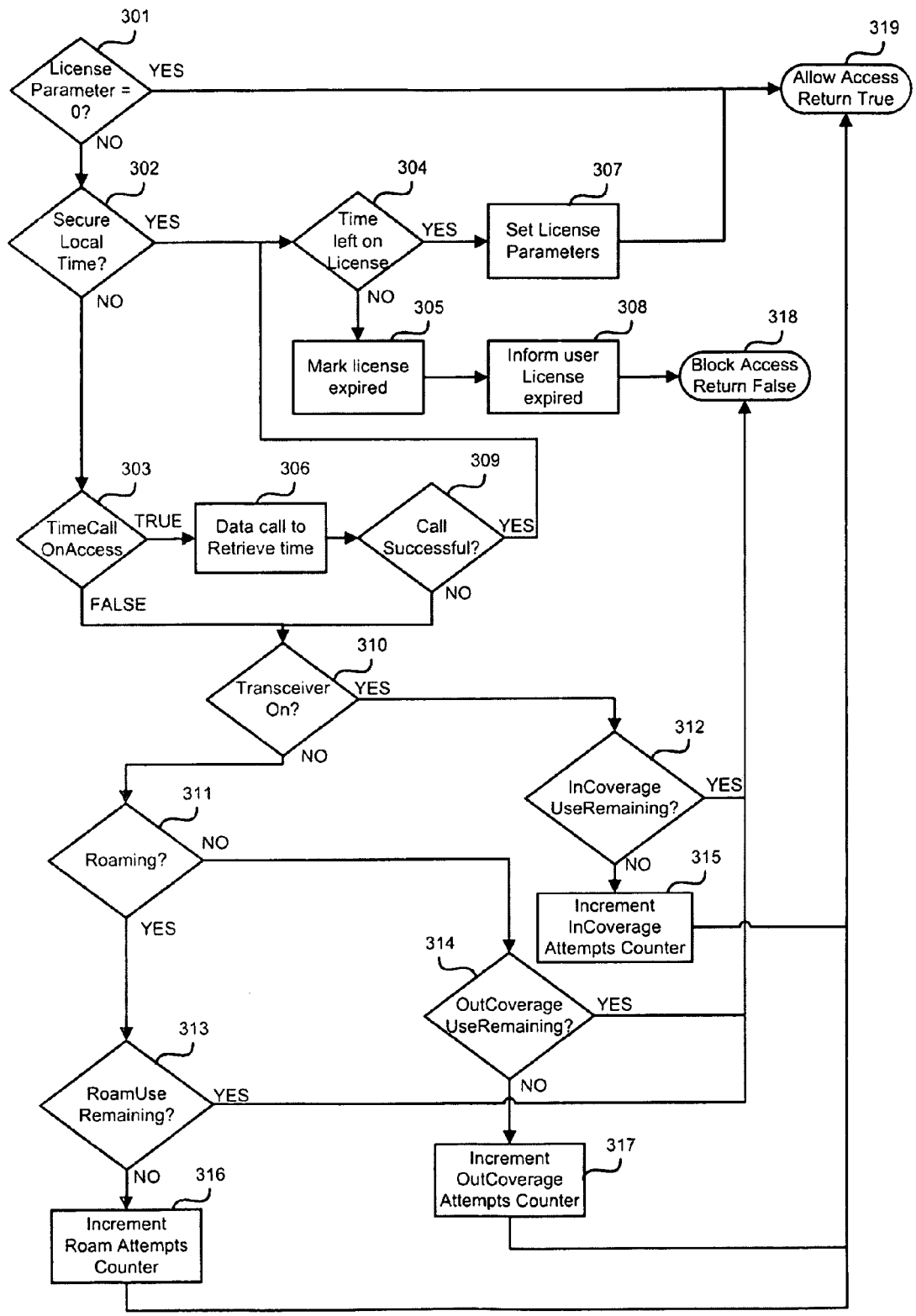
FIG. 4 is a process flow chart of an embodiment of a procedure which may be executed by the enforcement agent to enforce a parameterized time-based license policy.

FIG. 4 is a process flow chart of an embodiment of a procedure which may be executed by the enforcement agent 104. FIG. 4a is a listing of an example possible pseudo-code which may be utilized to implement the steps depicted in FIG. 4 by one of skill in the art. When protected content is originally downloaded by a client, a license is executed and the parameters governing the terms of the license may be stored in a secure portion of memory 111. Once the memory parameters are stored in the secure portion of memory 111, a license parameter counter (LP) may be incremented for each stored parameter. In step 301 shown in FIG. 4, the embodiment method determines whether a license is in place associated with protected content. If no license parameters have been stored in a secure portion of memory 111, then the value of LP will be zero. If the value of LP is zero, access to all digital content stored in memory 111 is granted, step 316. However, if the value of LP is not zero, then at least one time-based license may be in force.

In step 302, the enforcement agent 104 via the processor 110 may determine whether a local source of secure time 102 exists. If a secure time source is available, the enforcement agent 104 via the operating system 103 and processor 110 may check to see if the limited period of time for which a client has been granted access to the protected content for has elapsed, step 304. If the limited period of time has not elapsed then the enforcement agent 104 via the operating system 103 and processor 110 may set the InCoverageUseLimit to M, OutCoverageUse Limit to N, and the grace period counter to zero in step 307. The client is then granted access to the protected content in step 319.

If it is determined that the limited period of time has elapsed in step 304, the license may be marked as expired, step 305, and the client informed that the license has expired, step 308. After the client has been informed of the license expiration, access to the protected content is denied, step 318.

If in step 302 a local secure source of time 102 is not available, the enforcement agent 104 via the operating system 103 and processor 110 will look up the license parameters 105 associated with the protected content to determine if the TimeCallAtAccess parameter has been set to TRUE or FALSE, step 303. If the TimeCallAt Access parameter is set to FALSE, then the embodiment method determines whether the mobile device 200 is permitted grace period access attempts when the mobile device 200 is in-coverage, out of coverage or roaming (see steps 310-319 below).

If the TimeCallAtAccess parameter has been set to TRUE, then a call is made to a secure time source 202 to retrieve secure time, step 306. If the data call to retrieve a secure time source is successful, step 309, then the embodiment method may operate as if a local source of secure time is available in step 302 and continue on with steps 304, 305, 307, and 308. However, if the call to retrieve a secure time source is unsuccessful, the embodiment method will determine whether the client/user is permitted grace period access attempts when the mobile device 200 is in-coverage, out of coverage or roaming (see steps 310-319 below).

In order to determine whether the client/user is permitted to make grace period access attempts when the mobile device 100, 200 is either in-coverage, out of coverage or roaming, the embodiment method must first determine which state the mobile device 200, is in (i.e., in-coverage, out of coverage, or roaming). To make this determination, the enforcement agent 104 via the operating system 103 and processor 110 determines whether the mobile device's 200 transceiver functionality is enabled, step 310.

If the transceiver functionality is disabled or the data call was unsuccessful, it may be assumed that the mobile device 200 is in-coverage. If the transceiver functionality was disabled, it is assumed that the mobile device 200 would be able to successfully complete the data call to retrieve secure time but for the disabled transceiver functionality. Since the mobile device 200 is in-coverage, the enforcement agent 104 via the operating system 103 and processor 110 determines whether the license policy allows the client/user to make any in-coverage grace period access attempts, M, step 312. The enforcement agent 104 via the operating system 103 and processor 110 will check a grace period counter and compare it to the IntCoverageUseLimit value M to determine if there are any grace period access attempts still available to the client, step 312. If the comparison of grace period counter and InCoverageUseLimit value M determines that additional grace period access attempts are available, step 312, the grace period attempt counter is increased, step 315, and access to the protected content is granted, step 319. If the comparison of the grace period counter and the InCoverageUseLimit value M determines that additional grace period access attempts are not available, step 312, access to the protected content is blocked, step 318.

If in step 310 it is determined that the transceiver functionality is enabled, but the mobile device 200 was unsuccessful in completing the data call to retrieve secure time from secure time source 202, it may be assumed that the mobile device 200 is either out of coverage or in roaming mode. Accordingly, the embodiment method must determine which condition applies. In step 311, the enforcement agent 104 via the operating system 103 and processor 110 determines whether the mobile device is in roaming mode (i.e., voice calls are available but data calls are not). In most mobile devices 200, this determination is previously made to determine if additional charges for voice calls should apply. If the mobile device 200 is in roaming mode, the enforcement agent 104 via the operating system 103 and processor 110 determines whether the license policy allows the client/user to make any roaming grace period access attempts, R, step 313. The enforcement agent 104 via the operating system 103 and processor 110 will check a grace period counter and compare it to the RoamUseLimit value R to determine if there are any grace period access attempts still available to the client, step 313. If the comparison of the grace period counter and the RoamUseLimit value R determines that additional grace period access attempts are available, step 313, the grace period attempt counter is incremented, step 316, and access to the protected content is granted, step 319. If the comparison of the grace period counter and the RoamUseLimit value R determines that additional grace period access attempts are not available, step 313, access to the protected content is blocked, step 318.

If in step 311 it is determined that the mobile device 200 is not in roaming mode, it may be assumed that the mobile device 200 is out of coverage. If the mobile device 200 is out of coverage, step 311, then the enforcement agent 104 via the operating system 103 and processor 110 determines whether the license policy allows the client/user to make any out-of coverage grace period access attempts, N, step 314. The enforcement agent 104 via the operating system 103 and processor 110 will check a grace period counter and compare it to the OutCoverageUseLimit value N to determine if there are any grace period access attempts still available to the client, step 314. If the comparison of the grace period counter and the OutCoverageUseLimit value N determines that additional grace period access attempts are available, step 314, the grace period attempt counter is incremented, step 317, and access to the protected content is granted, step 319. If the comparison of the grace period counter and the OutCoverageUseLimit value N determines that additional grace period access attempts are not available, step 314, access to the protected content is blocked, step 318.

Alternative embodiments (not shown) may simplify the method by eliminating the RoamUseLimit parameter value R. Instead a parameter such as UseInCoverageForRoaming parameter value may be utilized, which may be set to either TRUE or FALSE. If it is set to TRUE, and the mobile device 200 is determined to be in roaming mode, the enforcement agent 104 via the operating system 102 and processor 110 treat the mobile device 200 in roaming mode as if the mobile device 200 were in coverage (i.e., in coverage with the transceiver functionality disabled). Thus, grace period access attempts while in roaming mode are charged against the InCoverageUseLimit M. If the UseInCoverageForRoaming parameter is set to FALSE, and the mobile device 200 is determined to be in roaming mode, the enforcement agent 104 via the operating system 102 and processor 110 treat the mobile device 200 in roaming mode as if the mobile device 200 were out of coverage. Thus, grace period access attempts while in roaming mode are charged against the OutCoverageUseLimit N.

FIG. 4a lists a sample pseudo code that may be implemented to perform the steps shown in FIG. 4 and described above. As shown in FIG. 4a, in line 401 a procedure TestContentLicensing is named. LicenseParameters is a reference to a data structure holding the license parameters 105, 205 for a license policy. Line 402 begins the body of the procedure TestContentLicensing. Line 403 checks whether the argument passed to procedure TestContentLicensing is null (see step 301 in FIG. 4). A null argument may occur, accidentally or intentionally, when the procedure TestContentLicensing is called with respect to content for which there is no license. If there is no license, the procedure assumes that the content may be accessed, and so line 404 directs that execution continue at the statements labeled AllowAccess (step 319 in FIG. 4).

The assertion in line 410 may be treated simply as a comment, or line 410 may be used to direct manual or automatic debugging or validation of the correctness of the procedure. Line 411 determines whether there is a local source of secure time, such as a secure clock 102 on the mobile device 100 (step 302). In an embodiment, the secure clock 102 may continue to operate after the rest of the mobile device 100 is powered off. If a local source of time 102 is secure, line 413 directs execution to continue at the statements labeled TestForExpiration, (step 304 in FIG. 4). Otherwise, execution continues following line 413. Line 420 may be considered as a comment or may be used for validation of the correctness of the procedure. Line 421 determines the value of the TimeCallAtAccess parameter in the data structure referenced by LicenseParameters (step 303 in FIG. 4). If the value is set to True, then line 422 initiates a call to retrieve secure time from the secure time source 202 on service provider network 201 (step 306 of FIG. 4). If the call successfully retrieves secure time at line 422, the secure time is stored in local variable STime, and line 424 directs execution to continue at the statements labeled TestForExpiration (step 304 of FIG. 4).

In FIG. 4a, line 430 asserts that secure time is unavailable. Line 431 begins a sequence of cases determining the mode of operation of the mobile device 200. Line 431 determines whether the mobile device 200 is operating in coverage, out of coverage or in roaming mode (steps 310 and 311 of FIG. 4). That is, if the mode of operation of the mobile device 100, 200 is in-coverage, line 432 directs execution to continue at the statements labeled CoverageIn (step 312, 315 of FIG. 4). If the mode of operation of the mobile device 200 is roaming, line 434 directs execution to continue at the statements labeled Roaming. If the mode of operation of the mobile device 200 is out of coverage, line 436 directs execution to continue at the statements labeled CoverageOut. (step (step (step In FIG. 4a, line 440 labels a sequence of statements with the label CoverageIn. The lines beginning at line 440 respond to the case of the mobile device being in an in-coverage mode (step 312 of FIG. 4). Line 441 examines the variable value of the InUsesAttempts access-counter to see if any more grace-period accesses to the protected content remain while the mobile device 200 is operating in in-coverage mode (step 312 of FIG. 4). If no more in-coverage grace-period accesses remain, line 442 directs execution to continue at the statement labeled BlockAccess (step 318 of FIG. 4). Otherwise, execution continues at line 443, which increments the counter named InUsesAttempted (step 315 of FIG. 4). To simplify programming, the counter InUsesAttempted may be an integer variable field located in the same data structure that is referenced by LicenseParameters, which also contains the license parameters. Line 444 directs execution to continue at the statements labeled AllowAccess (step 319 of FIG. 4).

In FIG. 4a, line 450 labels a sequence of statements with the label Roaming. The lines beginning at line 450 respond to the case of the mobile device being in a roaming mode (step 313 of FIG. 4). Line 451 examines the variable value of the RoamUsesAttempts access-counter to see if any more grace-period accesses to the protected content remain while the mobile device 200 is operating in roaming mode (step 313 of FIG. 4). If no more roaming grace-period accesses remain, line 452 directs execution to continue at the statement labeled BlockAccess (step 318 of FIG. 4). Otherwise, execution continues at line 453, which increments the counter named RoamUsesAttempted (step 316 of FIG. 4). To simplify programming, the counter RoamUsesAttempted may be an integer variable field located in the same data structure that is referenced by LicenseParameters, which also contains the license parameters. Line 454 directs execution to continue at the statements labeled AllowAccess (step 319 of FIG. 4).

(In FIG. 4a, line 460 labels a sequence of statements with the label CoverageOut. The lines beginning at line 460 respond to the case of the mobile device being in an out-of-coverage mode. Line 461 examines the value of OutUsesAttempts to see if any more grace-period accesses to the protected content remain while the mobile device 200 is operating in out-of-coverage mode (step 314 of FIG. 4). If no more out-of-coverage grace-period accesses remain, line 462 directs execution to continue at the statement labeled BlockAccess (step 318 of FIG. 4). Otherwise, execution continues at line 463, which increments the counter named OutUsesAttempted (step 317 of FIG. 4). To simplify programming, OutUsesAttempted may be an integer variable field located in the same data structure that is referenced by LicenseParameters, which also contains the license parameters. Line 464 directs execution to continue at the statements labeled AllowAccess (step (319 of FIG. 4).

In FIG. 4a, line 470 labels a sequence of statements with the label TestForExpiration which validate the license whenever the time STime is known to be secure, as asserted in line 471 (step 302 of FIG. 4). Line 472 compares the current secure time, STime, with the ExpirationDate parameter of the data structure referenced by LicenseParameters (step 307 of FIG. 4). If STime is greater than—that is, after—the expiration date/time value in parameter ExpirationDate of LicenseParameters, then the license is expired. Line 473 performs some action to indicate unequivocally that the license as expired (step 305 of FIG. 4). The action may delete the license parameter data structure and the protected content, but this complicates subsequent renewal of access rights. An alternative action in line 473 is to mark the license as expired within the data structure referenced by LicenseParameters (step 305 of FIG. 4). For example, the data structure may have a boolean field called Expired which is set to True. In any case, line 474 sets the value of InUseAttempts to a value greater than the InCoverageUseLimit M. Line 475 sets the value of RoamUseAttempts to a value greater than the RoamCoverageUseLimit R. Line 476 sets the value of OutUseAttempts to a value greater than the OutCoverageUseLimit N. In lines 477-479, the values of InCoverageUseLimit, RoamUseLimit, and OutCoverageUseLimit are each set to zero in the data structure referenced by LicenseParameters. The zero values prevent a client from cheating and using any remaining unused out-of-coverage grace period access by intentionally shielding the mobile device 200 from coverage. Line 480 informs the client that the license has expired and may invite the client to renew the license (step 308 of FIG. 4). Line 479 directs execution to the statements labeled BlockAccess, which will prevent the protected content from being accessed (step 318 of FIG. 4).

If the comparison in line 472 found that the license is still valid based on STime (step 304 of FIG. 4), then lines 483-485 reset the integer grace-period access counters (step 307 of FIG. 4), InUsesAttempts, RoamUseAttempts and OutUseAttempts to zero, which may be located in the same data structure LicenseParameters, which contains the license parameters of the license policy. Because the license was determined to be unexpired and the time was secure, the grace-period access counters, InUsesAttempts, RoamUseAttempts and OutUsesAttempts are reset to zero.

In FIG. 4a line 490 attaches the label AllowAccess to the statement in line 491, which exits the procedure and returns the value True to the caller of the procedure TestContentLicensing to indicate that the license is to be treated as unexpired, even if secure time may not have been available (step 319 of FIG. 4). Line 495 attaches the label BlockAccess to the statement in line 496, which exits the procedure and returns the value False to the caller of the procedure TestContentLicensing to indicate that the license is to be treated as expired (step 318 of FIG. 4). Line 499 marks the end of the procedure TestContentLicensing.

FIG. 4b lists a sample pseudo code which may be implemented to carry out the alternative procedure when a value of RoamUseLimit is not utilized, but rather the method defaults to either the InUseLimit when in roaming mode. The sample pseudo code is substantially similar to the sample pseudo code in FIG. 4a, however, lines of code which reference RoamUseAttempts and RoamUseLimits are eliminated. Instead, new code lines 435-439 are added. One of skill in the art could easily generate a sample pseudo code to default to the OutUseLimit if desired. In line 435, if the mobile device 200 is deemed to be in neither in coverage or out of coverage, the mobile device 200 may be deemed to be in roaming mode. In line 436 the enforcement agent 104 via the operating system 103 and processor 110 determines from the UseInCoverageForRoaming parameter of the data structure referenced by LicenseParameters whether to treat the roaming mode the same as the in-coverage case or the out-of-coverage case. If the value of the UseInCoverageForRoaming parameter is True, then roaming mode will use the same policy parameters as for in-coverage mode, and line 437 directs execution to continue at the statements labeled CoverageIn. If the value of the UseInCoverageForRoaming parameter is False, then roaming mode will use the same policy parameters as for out-of-coverage, and line 439 directs execution to continue at the statements labeled CoverageOut. The sample pseudo code listings shown in FIGS. 4a and 4b are meant to only be examples of possible pseudo code that could be used to implement the steps of the various embodiments. They are not meant to limit the embodiments in any way.

For some embodiments, the service provider may be able to configure or modify the license parameters remotely and/or on the fly in the field. For example, the service provider can terminate licenses which may be identified with misuse or the service provider can remotely upgrade or renew a license upon payment from an existing licensed user. Remote upgrades or renewals may be accomplished by using standard methods for securely transmitting the new license parameter values over the air. Updates to the parameters may be pushed to the device using some means such as SMS with a digital signature.

Figure 5:
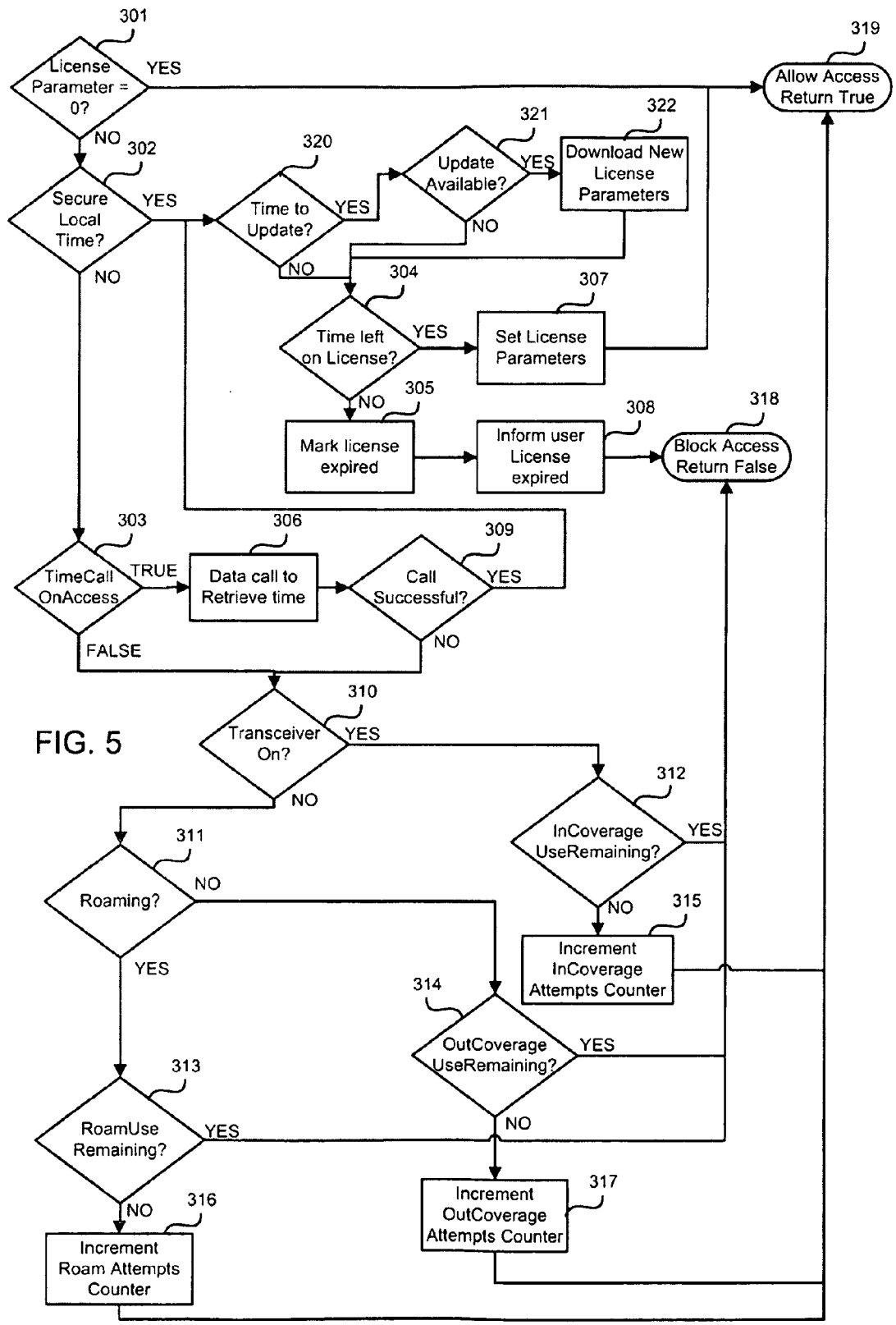
FIG. 5 is a process flow chart of an alternative embodiment of a procedure which may be executed by the enforcement agent.

FIG. 5 provides a flow chart of an alternative embodiment of a procedure which may be executed by the enforcement agent 104. The alternative embodiment includes all of the steps shown in FIG. 1, but also includes steps to permit a service provider with the ability to configure or modify license parameters remotely or in the field. FIG. 5a provides a sample listing of pseudo code which may be utilized to implement the steps depicted in FIG. 5 by one of skill in the art.

The alternative embodiment shown in FIG. 5 continues to implement steps 301-319 depicted in FIG. 4 and described above. However, in the alternative embodiment of FIG. 5, if the enforcement agent 104 via the operating system 103 and processor 110 determines that local secure time is available in step 302 or if the call to retrieve secure time is successful in step 309 then the enforcement agent 104 via the operating system 103 and processor 110 determines if it is time to update the license policies and/or parameters stored in the secure portion of memory 111, step 320. The time between updates may be an arbitrary period of time T. Time T may be pre-set by a service provider or may occur on an hourly, daily, monthly, etc. basis. If the pre-set period of time T has elapsed, the enforcement agent 104 via the operating system 103 and processor 110 will contact a service provider server (not shown) to determine if an update of licensing parameters (LP) is available, step 321. If an update of licensing parameters is available, the licensing parameters will be downloaded into the secure portion of memory 111, step 322. Once the updated licensing parameters have been downloaded, the enforcement agent 104 via the operating system 103 and processor 110 will continue to determine whether the client/user's time-based license has expired, step 304. If the license has not expired, the new license parameters will be set in step 307. The new license parameters may alter the grace period access attempts available to the client/user in instances where the mobile device is in-coverage, out of coverage, or roaming.

FIG. 5a identifies sample pseudo code that may be implemented to perform additional steps shown in FIG. 5. Additional pseudo code lines 500-511 are added. In FIG. 5a, line 411 checks if a local source of secure time is available. If a local source of secure time is available the sequence of steps labeled Check Updates is performed (step 320 of FIG. 5). In addition, if local secure time is not available, line 420, then a sequence of steps to retrieve secure time is made, lines 421-424 (see step 303, 306, 309 of FIG. 5)). If the call to retrieve secure time is successful (step 309 of FIG. 5)), then the sequence of steps labeled Check Updates is performed (step 320 of FIG. 5). In the Check Updates sequence, lines 500-510, a check is made to see if pre-set time T has elapsed, line 501 (step 320 of FIG. 5). If the pre-set time period T has elapsed, then a check is made to determine if updates are available from the service provider, line 502 (step 321 of FIG. 5). If an update is available then instructions to open a secure data channel are performed, line 504, and access statistics are sent to the service provider, line 505. The new license parameters are received from the service provider and stored, lines 506 and 507 (step 322. Once the new license parameters are stored, the secure data channel is closed, line 508. Once the secure data channel is closed in line 508, the sample pseudo code moves onto the Test for Expiration procedure outlined above with respect to FIG. 4a. If the pre-set period of time T, has not elapsed, line 501, then the procedure Test for Expiration is performed as outlined above with respect to FIG. 4a.

Updates to the license parameters may be the result of the client/user purchasing a new license and content, or renewing or upgrading the current license. When a new license or content is purchased, the process of uploading the new license or content includes storing new license parameter values, including resetting grace-period counters. In this method, updated license parameters are basically carried along as part of the download of the new content and license. When a user contacts a server to purchase/upgrade a new piece of content, accompanying the content and license rules governing the content itself (play until Aug. 15, 2008) is an update to the license parameters (call on startup, out of coverage grace periods, etc). These updated license parameters may be global, i.e., applied to all content/data, or may be applied only to the newly downloaded content itself. Since the purchase of new content requires the establishment of a secure data connection, the license parameters can be authenticated and encrypted and secured in a similar manner to that of the content data. This method allows license parameter updates to be implemented when users purchase new content downloads, obviating the need for an explicit data connection with the server at other times, thereby improving the user's experience. Using this method content providers can reward frequent purchasers of content with better/more friendly license parameters (e.g., longer licenses, more grace-period uses, etc.) so that the reward for buying more content is a better user experience. Thus, with each new purchase, the content provider can change the license parameters for all its content in the same download transaction.

In the case of an update to the protected content, the update of license parameters can be accompanied by the update, a step not shown in FIG. 5. If line 503 determines that an update is available, line 504 opens a secure data connection. The data connection may be secure in the sense that the mobile device 100, 200 prevents client/user access to the connection and the transmissions over the connection. In order to secure the parameter values and thwart possible tampering with the values, it may be advantageous to encrypt the parameters or embed the parameter values in a small piece of executable code and include digital signature or HMAC authentication. Line 505 causes the current license parameters and/or statistics about the access activity for the protected content to be sent to the service provider network. For example, the total number of accesses to the protected content may be a statistic kept in a data structure called AccessStatistics. Other statistics may be the number of times the grace-period counters LicenseParameters.InUseAttempts and LicenseParameters.OutUseAttempts have incremented above the limits M and N, respectively. The service provider may use these statistics to determine the values for the update of the license parameters, which the service provider network 201 transmits to the mobile device 100, 200. Line 506 saves the new license parameters of the update into temporary data structure NewLicenseParameters. Then line 507 copies the new values of the license parameters to the data structure referenced by LicenseParameters. Line 508 closes the secure data connection.

Figure 6:
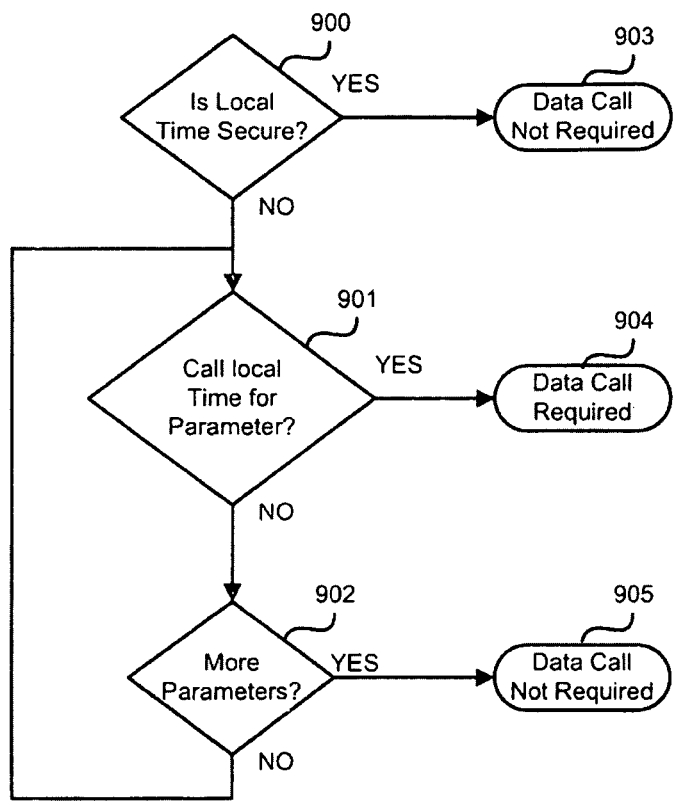
FIG. 6 is a process flow chart of the steps performed by an embodiment method which employs the TimeCallAt Startup parameter.

As discussed above, one of the possible usage licensing parameters employed by the embodiments is TimeCallAtStartup. If any protection policy sets this license parameter to TRUE, then secure time must be accessed from an internal source of secure time in the mobile device 100 or by a data call at the time the mobile device 200 when the device is powered on. FIG. 6 illustrates the steps performed by an embodiment method which employs the TimeCallAt Startup parameter.

As shown in FIG. 6, the enforcement agent 104 via the operating system 103 and processor 110 determines if the mobile device 100, 200 contains a local source of secure time, step 900. If the mobile device 100 contains a local source of secure time, then the enforcement agent 104 via the operating system 103 and processor 110 will return a value of FALSE indicating that no data call is necessary as secure time already exists locally on the mobile device 100, step 903. If, however, the mobile device 200 does not contain a local source of secure time, step 900, the enforcement agent 104 via the operating system 103 and processor 110 determines where the licensing parameters for a licensing policy stored in the secure portion of memory 111 have a TimeCallAtStartup set to TRUE, step 902. If so, a data call will be necessary prior to the grant of access to protected content, step 904.

If the first licensing policy does not contain a licensing parameter indicating TRUE for TimeCallAtStartup, the enforcement agent 104 via the operating system 103 and processor 110 will continue to check each licensing policy stored in the secure portion of memory 111, step 902. If any other license policy stored within the secure portion of memory 111 returns a value of TRUE for the parameter TimeCallAtStartup, the enforcement agent 104 via the operating system 103 and processor 110 will require a data call to a secure time source prior to the grant of access to protected content, step 904. If no license policy stored in the secure portion of memory 111 returns a value of True for TimeCallAtStartup then no data call will be made, step 905.

FIG. 6a identifies sample pseudo code that may be implemented to perform the steps shown in FIG. 6. As shown in FIG. 6a, the pseudo code loop may be referred to as IsStartupTimeFetchNeeded, which may be called as part of the software initiated when the mobile device is powered up. Lines 601, 602 begin the procedure body. Line 603 determines whether secure time 102 is locally available, such as whether there is a secure clock on the mobile device 100, 200 which maintains time while the mobile device 100, 200 is powered off. If there is a local source 102 of secure time, the procedure exits in line 604 returning a result (FALSE) indicating that a data call is not required. If there is no local source 102 of secure time, or the secure clock requires initialization, validation, or synchronization, the execution of the procedure continues at line 610. The assertion in line 610 may be treated as a comment or may be helpful in manually or automatically validating the correctness of the procedure. Line 611 is the beginning of a loop which recurs for each license L found in the mobile device 200. Line 613 is the last line of the loop, as indicated by the indentation of the lines of the loop. Line 612 checks whether the parameter TimeCallAtStartup is set TRUE for any license L. If a license L is found in which TimeCallAtStartup is TRUE, the procedure exits at line 613 and returns TRUE as an indicator that secure time must be accessed from the network of the service provider at the time the mobile device 200 is started. If no license L was found having TimeCallAtStartup set to True, the loop eventually halts and continues execution at line 620. The assertion in line 620 may be treated as a comment or may be helpful in manually or automatically validating the correctness of the procedure. Line 621 causes execution to exit the procedure and return an indication, namely FALSE, that no license requires secure time to be accessed from a secure time source 302 on the service subscriber network 201. Line 622 marks the end of the body of procedure IsStartupTimeFetchNeeded. If the procedure returns TRUE, then the mobile device 200 places a data call to retrieve secure time from the secure time source 302 on the service provider network 201.

In alternative embodiments, more than a single license policy may be employed—that is, more than one set of policy parameters. A default policy (default set of license parameters) may be configured in a mobile device 100, 200 by the original equipment manufacture (OEM). The service provider who purchases and then subsequently resells the mobile device may dictate other policy parameters. A blanket upgraded or extended policy may be available from a service provider for an extra charge to the user. Alternatively, the service provider may further restrict certain default policy parameters. Further, the terms and conditions of individual licenses covering specific usage protected content may override the mobile device and/or service provider license parameters—either extending or further limiting the mobile device and/or service provider policies.

In an alternative embodiment, policy parameters or content usage statistics may be reported back to a content server, possibly through a secure channel, such as when the user's wireless device contacts the content server. Of particular importance may be data which indicates the number of times an application/content was launched—or attempted to be launched—when secure time was not available. Alternatively, an embodiment may report whether the in-coverage grace period limit M and out-of-coverage grace period limit N (in FIGS. 2 and 3) has been exceeded or the number of times the grace period limits were exceeded and subsequently reset since the last report. Such statistics can signal potential attempts of abuse and may be used to disallow further usage or further content purchases by that particular user. An embodiment can allow the provider network to dynamically modify parameters depending on purchased upgrades or on suspected abuse. The usage statistics can also provide feedback on the popularity of content. An embodiment may also provide an indication to user of the current usage protected content's usability status, such as the count of access attempts remaining during a grace period or period of roaming.

Figure 7:
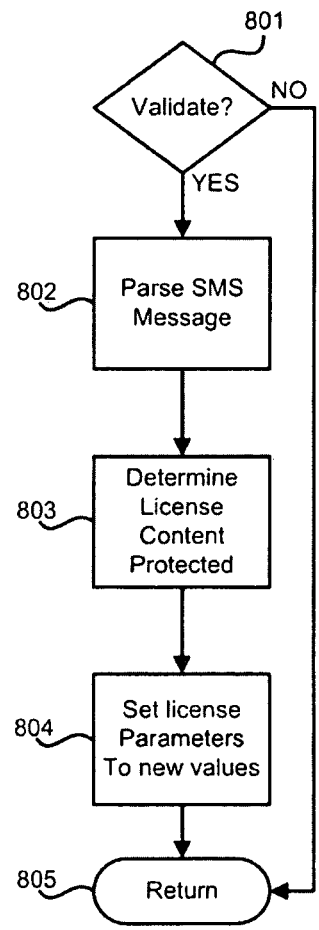
FIG. 7 is a process flow chart of the steps performed by an embodiment method for checking for and downloading updated license parameters.

In another embodiment the license parameters and/or the usage statistics associated with particular licensed content may be transmitted to an application server on the service provider's network 201 when the enforcement agent on the mobile device 100, 200 receives an SMS message from the application server. The server may then use the parameter values and/or the statistics to deny or allow access to the licensed content or to supplemental content FIG. 7 illustrates the steps performed by an embodiment method which allows a mobile device 100, 200 to receive an SMS message and modify license policies based on statistics transmitted in the SMS message. As shown in FIG. 7, when an SMS message is received by the mobile device 100, 200 the SMS message must be validated as a legitimate SMS message from the service provider and not a counterfeit message, step 801. If the SMS message is not validated in step 801, the SMS message is ignored and the mobile device 100, 200 is returned to await the next message, step 805. If the SMS message is validated as a legitimate SMS message, the SMS message is parsed in step 802 to convert the text fields into the new license policy parameter values. Included among these data fields may be identifiers to identify which license policies should apply the new license parameters values, step 803. Once the proper license policies have been identified in step 803 for modification, the new license parameter values are set in the secure portion of memory 111, step 804. After the new license parameter values have been set for the identified license policies, step 804, the mobile device 100, 200 is returned to a state awaiting the next SMS message, step 805.

FIG. 7a identifies sample pseudo code that may be implemented to perform the steps shown in FIG. 7. The sample pseudo-code listing may implement a procedure DoLicenseUpdateFromSMS, which may be called when a SMS message is received by the mobile device 100, 200 and identified as a SMS message to update a license. In line 701, SMS message is a reference to the SMS message passed to the procedure DoLicenseUpdateFromSMS. Line 702 begins the body of the procedure. Line 703 determines if the SMS message is legitimately from the service provider and not a counterfeit message (step 801 of FIG. 7). Line 704 parses the message contents and, as necessary, converts text fields to license parameter values (step 802 of FIG. 7). The SMS message may contain values for one, some, or all of the license parameters for at least one license or license policy. The SMS message may identify an individual protected content license L, which is targeted by the SMS message (step 803 of FIG. 7). DoLicenseUpdateFromSMS assumes that one license is being updated by the SMS message, which may be the typical case. However, more than one license can be updated with the SMS message. Line 705 determines that the SMS message content identifies and locates the license parameters of license L. Line 706 sets the LicenseParameters of license L to the new values determined by parsing the user data portion of the SMS message, SMSMessage (step 804 of FIG. 7). Line 707 returns execution to the caller of procedure DoLicenseUpdateFromSMS (step 805 of FIG. 7). Line 710 may be treated as a comment that the SMSMessage is a fake. Line 711 returns execution to the caller of procedure DoLicenseUpdateFromSMS. Line 712 marks the end of the procedure body.

The hardware used to implement the method steps of FIGS. 4, 4a, 4b, 5, 5a, 6, 6a, 7, 7a and policies shown in FIG. 3 may be processing elements and memory elements configured to execute a set of instructions, wherein the set of instructions are for performing method steps corresponding to the above policies. Alternatively, some policies may be performed by circuitry that is specific to a given function.

In an embodiment having a power management integrated circuit (WMIC), power is maintained to the clock even if the main battery is removed. This means that a local secure clock 102 is able to maintain its state between power cycles—at least for some specified period of time, such as a number of days. This provides a more user-friendly experience, because the client does not see a delay incurred to retrieve or update time from a remote source before gaining access to protected content. It also means that while roaming or out of any service provider network 201 area and external secure time from the network is unavailable, the client may still access protected content licensed under a time-based license policy.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a DVD disk, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the present invention has been disclosed with reference to specific example embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

We claim:

1. A mobile device, comprising:
a processor;
a wireless transceiver coupled to the processor and configured to connect to a wireless network; and
a memory coupled to the processor, the memory having stored therein software instructions configured to cause the processor to perform steps comprising:
storing protected content in the memory, wherein the protected content is licensed for a limited period of time;
storing a first parameter value in a secure portion of the memory that is not client accessible, wherein the first parameter value on the mobile device represents a first policy condition controlling access to the protected content when the mobile device does not have access to a source of secure time;
determining if the mobile device has access to the source of secure time;
granting access to the protected content if the mobile device has access to the source of secure time;
determining whether the first policy condition is satisfied if the mobile device does not have access to the source of secure time; and
providing access to the protected content so long as the first policy condition is satisfied.

2. The mobile device of claim 1, wherein the software instructions in the memory of the mobile device utilize a first parameter value which is a number of allowed grace period access attempts when the mobile device is out of service network coverage.

3. The mobile device of claim 1, wherein the software instructions in the memory of the mobile device utilize a first parameter value which is a number of allowed grace period access attempts when the mobile device is within service network coverage.

4. The mobile device of claim 1, wherein the software instructions in the memory of the mobile device utilize a first parameter value which is a number of allowed grace period access attempts when the mobile device is roaming.

5. The mobile device of claim 1, wherein the software instructions in the memory of the mobile device utilize a first parameter value that indicates whether the mobile device must access a remote source of secure time each time access to the protected content is granted.

6. The mobile device of claim 1, wherein the software instructions in the memory of the mobile device utilize a first parameter value that indicates whether the mobile device must access a remote source of secure time each time the mobile device is powered up.

7. The mobile device of claim 1, wherein the software instructions in the memory of the mobile device are further configured to cause the processor to perform the steps of:
querying a protected content provider server on a periodic basis to determine whether an update to the first parameter value exists;
downloading the update to the first parameter value if the update exists; and
storing the update to the first parameter value in the memory of the mobile device.

8. The mobile device of claim 7, wherein the software instructions in the memory of the mobile device are further configured to cause the processor to perform the step of parsing and decrypting the downloaded update to the first parameter.

9. The mobile device of claim 8, wherein the software instructions in the memory of the mobile device are further configured to cause the processor to perform the step of receiving the update to the first parameter in an SMS message.

10. The mobile device of claim 1, wherein the software instructions in the memory of the mobile device are further configured to cause the processor to perform the step of storing multiple parameter values representing multiple policy conditions controlling access to the protected content when the mobile device does not have access to a source of secure time.

11. The mobile device of claim 10, wherein at least one of the multiple parameter values utilized by the software instructions in the memory of the mobile device is a number of allowed grace period access attempts when the mobile device is out of service network coverage.

12. The mobile device of claim 10, wherein at least one of the multiple parameter values utilized by the software instructions in the memory of the mobile device is a number of allowed grace period access attempts when the mobile device is within service network coverage.

13. The mobile device of claim 10, wherein at least one of the multiple parameter values utilized by the software instructions in the memory of the mobile device is a number of allowed grace period access attempts when the mobile device is roaming.

14. The mobile device of claim 10, wherein at least one of the multiple parameter values utilized by the software instructions in the memory of the mobile device indicates whether the mobile device must access a remote source of secure time each time access to the protected content is granted.

15. The mobile device of claim 10, wherein at least one of the multiple parameter values utilized by the software instructions in the memory of the mobile device indicates whether the mobile device must access a remote source of secure time each time the mobile device is powered up.

16. The mobile device of claim 10 wherein the software instructions in the memory of the mobile device are further configured to cause the processor to perform the steps of:
   querying a protected content provider server on a periodic basis to determine whether updates to the multiple parameter values exist;
   downloading the updates to the multiple parameter value if the updates exist; and
   storing the updates to the multiple parameter values to the memory of the mobile device.

17. The mobile device of claim 16, wherein the software instructions in the memory of the mobile device are further configured to cause the processor to perform the step of parsing and decrypting the downloaded update to the first parameter.

18. The mobile device of claim 17, wherein the software instructions in the memory of the mobile device are further configured to cause the processor to perform the step of receiving the update to the first parameter in an SMS message.

19. The mobile device of claim 10, wherein the software instructions in the memory of the mobile device are further configured to cause the processor to perform the step of downloading updates to the multiple parameter values in conjunction with a purchase of new protected content.

20. A mobile device, comprising:
   means for storing protected content on the mobile device, wherein the protected content is licensed for a limited period of time;
   means for storing a first parameter value on the mobile device in a secure manner that is not client accessible, wherein the first parameter value represents a first policy condition controlling access to the protected content when the mobile device does not have access to a source of secure time;
   means for determining if the mobile device has access to the source of secure time;
   means for granting access to the protected content if the mobile device has access to the source of secure time;
   means for determining whether the first policy condition is satisfied if the mobile device does not have access to the source of secure time; and
   means for providing access to the protected content so long as the first policy condition is satisfied.

21. The mobile device of claim 20, wherein the first parameter value stored on the mobile device is a number of allowed grace period access attempts when the mobile device is out of service network coverage.

22. The mobile device of claim 20, wherein the first parameter value stored on the mobile device is a number of allowed grace period access attempts when the mobile device is within service network coverage.

23. The mobile device of claim 20, wherein the first parameter value stored on the mobile device is a number of allowed grace period access attempts when the mobile device is roaming.

24. The mobile device of claim 20, wherein the first parameter value stored on the mobile device indicates whether the mobile device must access a remote source of secure time each time access to the protected content is granted.

25. The mobile device of claim 20, wherein the first parameter value stored on the mobile device indicates whether the mobile device must access a remote source of secure time each time the mobile device is powered up.

26. The mobile device of claim 20, further comprising:
   means for querying a protected content provider server on a periodic basis to determine whether an update to the first parameter value exists;
   means for downloading the update to the first parameter value if the update exists; and
   means for storing the update to the first parameter value on the mobile device.

27. The mobile device of claim 26, further comprising means to decrypt the downloaded update to the first parameter.

28. The mobile device of claim 26, further comprising means to receive and parse the update to the first parameter in an SMS message.

29. The mobile device of claim 20, further comprising means for storing multiple parameter values representing multiple policy conditions controlling access to the protected content when the mobile device does not have access to a source of secure time.

30. The mobile device of claim 29, wherein at least one of the multiple parameter values stored on the mobile device is a number of allowed grace period access attempts when the mobile device is out of service network coverage.

31. The mobile device of claim 29, wherein at least one of the multiple parameter values stored on the mobile device is a number of allowed grace period access attempts when the mobile device is within service network coverage.

32. The mobile device of claim 29, wherein at least one of the multiple parameter values stored on the mobile device is a number of allowed grace period access attempts when the mobile device is roaming.

33. The mobile device of claim 29, wherein at least one of the multiple parameter values stored on the mobile device indicates whether the mobile device must access a remote source of secure time each time access to the protected content is granted.

34. The mobile device of claim 29, wherein at least one of the multiple parameter values stored on the mobile device indicates whether the mobile device must access a remote source of secure time each time the mobile device is powered up.

35. The mobile device of claim 20, further comprising
   means for querying a protected content provider server on a periodic basis to determine whether updates to the multiple parameter values exist;
   means for downloading the updates to the multiple parameter value if the updates exist; and
   means for storing the updates to the multiple parameter values on the mobile device, wherein the updates to the multiple parameter value represent multiple policy conditions controlling access to the protected content when the mobile device does not have access to a source of secure time.

36. The mobile device of claim 35, further comprising means for decrypting the downloaded updates to the multiple parameters.

37. The mobile device of claim 35, further comprising means for receiving and parsing the updates to the multiple parameters in a SMS message.

38. The mobile device of claim 29, further comprising means for downloading updates to the multiple parameter values in conjunction with a purchase of new protected content.

39. A mobile device, comprising:
   means for storing a file of protected content on the mobile device, wherein each individual file of protected content is licensed for a limited period of time;

means for storing at least a first parameter value on the mobile device in a secure manner that is not client accessible, wherein the first parameter value represents a first policy condition controlling access to each individual file of protected content when the mobile device does not have access to a source of secure time;

means for determining if the mobile device has access to the source of secure time;

means for granting access to each individual file of protected content if the mobile device has access to the source of secure time;

means for determining whether the first policy condition for each individual file of protected content is satisfied if the mobile device does not have access to the source of secure time; and means for providing access to each individual file of protected content so long as the first policy condition is satisfied.

40. The mobile device of claim 39, wherein the first parameter value stored on the mobile device is a number of allowed grace period access attempts when the mobile device is out of service network coverage.

41. The mobile device of claim 39, wherein the first parameter value stored on the mobile device is a number of allowed grace period access attempts when the mobile device is within service network coverage.

42. The mobile device of claim 39, wherein the first parameter value stored on the mobile device is a number of allowed grace period access attempts when the mobile device is roaming.

43. The mobile device of claim 39, wherein the first parameter value stored on the mobile device indicates whether the mobile device must access a remote source of secure time each time access to the protected content is granted.

44. The mobile device of claim 39, wherein the first parameter value stored on the mobile device indicates whether the mobile device must access a remote source of secure time each time the mobile device is powered up.

45. The mobile device of claim 39, further comprising:
means for querying a protected content provider server on a periodic basis to determine whether an update to the first parameter value exists;
means for downloading the update to the first parameter value if the update exists; and
means for storing the update to the first parameter value in the means for storing of the mobile device, wherein the update to the first parameter value represents a first policy condition controlling access to each individual file of protected content when the mobile device does not have access to a source of secure time.

46. The mobile device of claim 45, further comprising means for decrypting the downloaded update to the first parameter.

47. The mobile device of claim 45, further comprising means for receiving and parsing the update to the first parameter in an SMS message.

48. The mobile device of claim 39, further comprising means for storing multiple parameter values representing a multiple policy conditions controlling access to the protected content when the mobile device does not have access to a source of secure time.

49. The mobile device of claim 48, wherein one of the multiple parameter values stored on the mobile device is a number of allowed grace period access attempts when the mobile device is out of service network coverage.

50. The mobile device of claim 48, wherein one of the multiple parameter values stored on the mobile device is a number of allowed grace period access attempts when the mobile device is within service network coverage.

51. The mobile device of claim 48, wherein one of the multiple parameter values stored on the mobile device is a number of allowed grace period access attempts when the mobile device is roaming.

52. The mobile device of claim 48, wherein one of the multiple parameter values stored on the mobile device indicates whether the mobile device must access a remote source of secure time each time access to the protected content is granted.

53. The mobile device of claim 48, wherein one of the multiple parameter values stored on the mobile device indicates whether the mobile device must access a remote source of secure time each time the mobile device is powered up.

54. The mobile device of claim 48, further comprising
means for querying a protected content provider server on a periodic basis to determine whether updates to the multiple parameter values exist;
means for downloading the updates to the multiple parameter value if the updates exist; and
means for storing the updates to the multiple parameter values on the mobile device, wherein the updates to the multiple parameter value represent multiple policy conditions controlling access to the protected content when the mobile device does not have access to a source of secure time.

55. The mobile device of claim 54, further comprising means for decrypting the downloaded update to the first parameter.

56. The mobile device of claim 54, further comprising means for receiving and parsing the update to the first parameter in an SMS message.

57. The mobile device of claim 48, further comprising means for querying each of the stored multiple parameters values representing the multiple policy conditions each time the mobile device is powered up to determine if any of the stored multiple parameter values indicates whether the mobile device must access a remote source of secure time each time the mobile device is powered up.

58. The mobile device of claim 48, further comprising means for downloading updates to the multiple parameter values in conjunction with a purchase of new protected content.

* * * * *